United States Patent
Wei et al.

(10) Patent No.: US 12,336,018 B2
(45) Date of Patent: Jun. 17, 2025

(54) RANDOM ACCESS CHANNEL CONFIGURATION IN AN INTEGRATED ACCESS AND BACKHAUL NETWORK

(71) Applicant: Apple Inc., Cupertino, CA (US)

(72) Inventors: Lili Wei, Portland, OR (US); Qian Li, Beaverton, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 17/441,631

(22) PCT Filed: May 1, 2020

(86) PCT No.: PCT/US2020/031183
§ 371 (c)(1),
(2) Date: Sep. 21, 2021

(87) PCT Pub. No.: WO2020/223703
PCT Pub. Date: Nov. 5, 2020

(65) Prior Publication Data
US 2022/0150983 A1    May 12, 2022

Related U.S. Application Data

(60) Provisional application No. 62/842,417, filed on May 2, 2019.

(51) Int. Cl.
*H04W 74/08* (2024.01)
*H04W 72/0446* (2023.01)
(Continued)

(52) U.S. Cl.
CPC ... *H04W 74/0841* (2013.01); *H04W 72/0446* (2013.01); *H04W 74/0866* (2013.01); *H04W 76/20* (2018.02); *H04W 88/14* (2013.01)

(58) Field of Classification Search
CPC ......... H04W 74/0841; H04W 72/0446; H04W 74/0866; H04W 76/20; H04W 88/14; H04W 74/0833
See application file for complete search history.

(56) References Cited

U.S. PATENT DOCUMENTS

| | | | |
|---|---|---|---|
| 2020/0015274 A1* | 1/2020 | Islam | H04L 5/0053 |
| 2021/0298088 A1* | 9/2021 | Qi | H04L 5/0051 |
| 2021/0400661 A1* | 12/2021 | Harada | H04W 72/23 |

FOREIGN PATENT DOCUMENTS

| | | |
|---|---|---|
| CN | 105075146 | 11/2015 |
| CN | 108353342 | 7/2018 |

OTHER PUBLICATIONS

Samsung (Support of RACH Occasions and Periodicity for IAB RACH, R1-1904416, Apr. 2019).*

(Continued)

Primary Examiner — Lakeram Jangbahadur
(74) Attorney, Agent, or Firm — Fish & Richardson P.C.

(57) ABSTRACT

Disclosed are methods, systems, apparatus, and computer programs for communicating new random access channel (RACH) configurations for a node in an integrated access and backhaul (IAB) network. In one aspect, a method includes receiving a Radio Resource Control (RRC) message from the IAB node; determining, based on the RRC message, a new random access channel (RACH) configuration; and in response to determining the new RACH configuration, initiating a random access procedure with the IAB node using the new RACH configuration.

20 Claims, 10 Drawing Sheets

(51) Int. Cl.
    *H04W 74/0833*     (2024.01)
    *H04W 76/20*     (2018.01)
    *H04W 88/14*     (2009.01)

(56) References Cited

OTHER PUBLICATIONS

Qualcomm (Enhancements to support NR backhaul links, R1-1813417, Nov. 2018).*
Qualcomm005 (Updated proposal for RACH extension for IAB, R1-1905005, Apr. 2019).*
[No Author Listed], "3GPP TR 38.874 V 16.0.0, 3rd Generation Partnership Project; Technical Specification Group Radio Access Network; NR; Study on Integrated Access and Backhual; (Release 16)," 3GPP, Dec. 2018, 11 pages.
[No Author Listed], "3GPP Ts 38.211 V 15.5.0, 3rd Generation Partnership Project; Technical Specification Group Radio Access Network; NR; Physical Channels and Modulation; (Release 15)," Mar. 2019, 96 pages.
[No Author Listed], "Chairman's notes of AI 6.2.1 Additional MTC Enhancements," 3GPP TSG RAN WG1 Meeting #96bis, R1-1905566, Xi'an, China, Apr. 8-12, 2019, 7 pages.
[No Author Listed], "Chairman's notes of AI 6.2.2 Additional Enhancements for NB-IOT," 3GPP TSG RAN WG1 Meeting #96bis, R1-1905567, Xi'an, China, Apr. 8-12, 2019, 5 pages.
[No Author Listed], "Chairman's notes of AI 6.2.3 DL MIMO efficiency enhancements for LTE," 3GPP TSG RAN WG1 Meeting #96bis, R1-1905568, Xi'an, China, Apr. 8-12, 2019, 2 pages.
[No Author Listed], "Chairman's notes of AI 7.1.2 Maintenance for MIMO," 3GPP TSG RAN WG1 Meeting #96bis, R1-1905797, Xi'an, China, Apr. 8-12, 2019, 2 pages.
[No Author Listed], "Chairman's notes of AI 7.1.5 Maintenance for UL power control, " 3GPP TSG RAN WG1 Meeting #96bis, R1-1905799, Xi'an, China, Apr. 8-12, 2019, 1 page.
[No Author Listed], "Chairman's notes of AI 7.2.8 Enhancements on MIMO for NR," 3GPP TSG RAN WG1 Meeting #96bis, R1-1905803, Xi'an, China, Apr. 8-12, 2019, 13 pages.
[No Author Listed], 3GPP TS 38.331 V 15.5.1, 3rd Generation Partnership Project; Technical Specification Group Radio Access Network; NR; Radio Resource Control (RRC) protocol specification (Release 15), Apr. 2019, 491 pages.
Ad-hoc Chair (Samsung), "Chairman's notes of AI 6.2.1 Additional MTC Enhancements," 3GPP TSG RAN WG1 Meeting #96, R1-1903664, Athens, Greece, Feb. 25-Mar. 1, 2019, 6 pages.
Ad-hoc Chair (Ericsson), "Chairman's notes of AI 6.1.1 Maintenance of E-UTRA Release 8-14," 3GPP TSG-RAN WG1 Meeting #96 Tdoc, R1-1903524, Athens, Greece, Feb. 25-Mar. 1, 2019, 2 pages.
Ad-hoc Chair (Ericsson), "Chairman's notes of AI 6.1.1 Maintenance of E-UTRA Release 8-14," 3GPP TSG-RAN WG1 Meeting #96bis, Tdoc R1-1905564, Xi'an, China, Apr. 8-12, 2019, 2 pages.
Ad-hoc Chair (Ericsson), "Chairman's notes of AI 6.1.2 Maintenance of E-UTRA Release 15," 3GPP TSG-RAN WG1 Meeting #96, Tdoc R1-1903525, Athens, Greece, Feb. 25-Mar. 1, 2019, 2 pages.
Ad-hoc Chair (Ericsson), "Chairman's notes of AI 6.1.2 Maintenance of E-UTRA Release 15," 3GPP TSG-RAN WG1 Meeting #96bis, Tdoc R1-1905565, Xi'an, China, Apr. 8-12, 2019, 1 page.
Ad-hoc Chair (Ericsson), "Chairman's notes of AI 6.2.4 LTE-based 5G Terrestrial Broadcast," 3GPP TSG-RAN WG1 Meeting #96bis, Tdoc R1-1905569, Xi'an, China, Apr. 8-12, 2019, 3 pages.
Ad-hoc Chair (Ericsson), "Chairman's notes of AI 6.2.4 Study on LTE-based 5G Terrestrial Broadcast," 3GPP TSG-RAN WG1 Meeting #96, Tdoc R1-1903657, Athens, Greece, Feb. 25-Mar. 1, 2019, 2 pages.
Ad-hoc Chair (Ericsson), "Chairman's notes of AI 6.2.5 Others," 3GPP TSG-RAN WG1 Meeting #96, Tdoc R1-1903658, Athens, Greece, Feb. 25-Mar. 1, 2019, 1 page.
Ad-hoc Chair (Ericsson), "Chairman's notes of AI 7.1.4 Maintenance for NR-LTE co-existence," 3GPP TSG-RAN WG1 Meeting #96 Tdoc, R1-1903626, Athens, Greece, Feb. 25-Mar. 1, 2019, 2 pages.
Ad-hoc Chair (Ericsson), "Chairman's notes of AI 7.1.4 Maintenance for NR-LTE co-existence," 3GPP TSG-RAN WG1 Meeting #96bis, Tdoc R1-1905798, Xi'an, China, Apr. 8-12, 2019, 1 page.
Ad-hoc Chair (Ericsson), "Chairman's notes of AI 7.2.10 Study on NR positioning support," 3GPP TSG-RAN WG1 Meeting #96, Tdoc R1-1903632, Athens, Greece, Feb. 25-Mar. 1, 2019, 5 pages.
Ad-hoc Chair (Ericsson), "Chairman's notes of AI 7.2.10 Study on NR positioning support," 3GPP TSG-RAN WG1 Meeting #96bis, Tdoc R1-1905804, Xi'an, China, Apr. 8-12, 2019, 5 pages.
Ad-hoc Chair (Ericsson), "Chairman's notes of AI 7.2.2 Study on NR-based Access to Unlicensed Spectrum," 3GPP TSG-RAN WG1 Meeting #96 Tdoc, R1-1903629, Athens, Greece, Feb. 25-Mar. 1, 2019, 8 pages.
Ad-hoc Chair (Ericsson), "Chairman's notes of AI 7.2.2 Study on NR-based Access to Unlicensed Spectrum," 3GPP TSG-RAN WG1 Meeting #96bis, Tdoc R1-1905801, Xi'an, China, Apr. 8-12, 2019, 10 pages.
Ad-hoc Chair (Ericsson), "Chairman's notes of AI 7.2.5 Study on solutions for NR to support Non Terrestrial Network (NTN), " 3GPP TSG-RAN WG1 Meeting #96bis, Tdoc R1-1905802, Xi'an, China, Apr. 8-12, 2019, 7 pages.
Ad-Hoc chair (NTT Docomo, Inc.), "Chairman's notes of AI 7.1.7," 3GPP TSG RAN WG1 #96bis, R1-1905800, Xi'an, China, Apr. 8-12, 2019, 6 pages.
Ad-Hoc chair (NTT Docomo, Inc.), "Chairman's notes of AI 7.1.7," 3GPP TSG RAN WG1 Meeting #96, R1-1903628, Athens, Greece, Feb. 25-Mar. 1, 2019, 2 pages.
Ad-hoc Chair (Samsung), "Chairman's notes of AI 6.2.1 Additional MTC Enhancements, " 3GPP TSG RAN WG1 Meeting #96, R1-1903526, Athens, Greece, Feb. 25-Mar. 1, 2019, 6 pages.
Ad-hoc Chair (Samsung), "Chairman's notes of AI 6.2.1 Additional MTC Enhancements, " 3GPP TSG RAN WG1 Meeting #96, R1-1903526, Athens, Greece, Feb. 25-Mar. 1, 2019, 7 pages.
Ad-hoc Chair (Samsung), "Chairman's notes of AI 6.2.2 Additional Enhancements for NB-IoT," 3GPP TSG RAN WG1 Meeting #96, R1-1903527, Athens, Greece, Feb. 25-Mar. 1, 2019, 5 pages.
Ad-hoc Chair (Samsung), "Chairman's notes of AI 6.2.2 Additional Enhancements for NB-IoT," 3GPP TSG RAN WG1 Meeting #96, R1-1903663, Athens, Greece, Feb. 25-Mar. 1, 2019, 5 pages.
Ad-hoc Chair (Samsung), "Chairman's notes of AI 6.2.3 DL MIMO efficiency enhancements for LTE," 3GPP TSG RAN WG1 Meeting #96, R1-1903656, Athens, Greece, Feb. 25-Mar. 1, 2019, 2 pages.
Ad-hoc Chair (Samsung), "Chairman's notes of AI 7.1.2 Maintenance for MIMO," 3GPP TSG RAN WG1 Meeting #96, R1-1903625, Athens, Greece, Feb. 25-Mar. 1, 2019, 5 pages.
Ad-hoc Chair (Samsung), "Chairman's notes of AI 7.1.5 Maintenance for UL power control," 3GPP TSG RAN WG1 Meeting #96, R1-1903627, Athens, Greece, Feb. 25-Mar. 1, 2019, 2 pages.
Ad-hoc Chair (Samsung), "Chairman's notes of AI 7.2.5 Cross Link Interference (CLI) handling and Remote Interference Management (RIM) for NR," 3GPP TSG RAN WG1 Meeting #96, R1-1903630, Athens, Greece, Feb. 25-Mar. 1, 2019, 4 pages.
Ad-hoc Chair (Samsung), "Chairman's notes of AI 7.2.8 Enhancements on MIMO for NR," 3GPP TSG RAN WG1 Meeting #96, R1-1903631, Athens, Greece, Feb. 25-Mar. 1, 2019, 9 pages.
International Preliminary Report on Patentability in International Appln. No. PCT/US2020/031183, dated Nov. 11, 2021, 7 pages.
International Search Report and Written Opinion in International Appln. No. PCT/US2020/031183, dated Aug. 5, 2020, 13 pages.
Qualcomm Incorporated, "Updated proposal for RACH extension for IAB," 3GPP TSG RAN WG1 Meeting #96, R1-1905005 Xi'an, China, Apr. 8-12, 2019, 8 pages.
Samsung, "Support of RACH Occasions and Periodicity for IAB RACH," 3GPP TSG RAN WG1 #96bis, R1-1904416, Xi'an, China Apr. 8-12, 2019, 7 pages.

* cited by examiner

RANDOM ACCESS CHANNEL CONFIGURATION IN AN INTEGRATED ACCESS AND BACKHAUL NETWORK

CLAIM OF PRIORITY

This application is a U.S. National Phase Application under 35 U.S.C. § 371 and claims the benefit of priority to International Application No. PCT/US2020/031183, filed May 1, 2020, which claims priority to U.S. Provisional Patent Application No. 62/842,417, entitled "RANDOM ACCESS CHANNEL CONFIGURATION IN AN INTEGRATED ACCESS AND BACKHAUL NETWORK," filed on May 2, 2019. The above-identified applications are incorporated herein by reference in their entirety.

BACKGROUND

User equipment (UE) can wirelessly communicate data using wireless communication networks. To wirelessly communicate data, the UE connects to a node of a radio access network (RAN) and synchronizes with the network.

SUMMARY

The present disclosure is directed towards methods, systems, apparatus, computer programs, or combinations thereof, for communicating new random access channel (RACH) configurations to integrated access and backhaul (TAB) nodes.

In accordance with one aspect of the present disclosure, in an integrated access and backhaul (IAB) network, a method includes receiving a Radio Resource Control (RRC) message from an IAB node; determining, based on the RRC message, a new random access channel (RACH) configuration; and in response to determining the new RACH configuration, initiating a random access procedure with the IAB node using the new RACH configuration.

Other versions include corresponding systems, apparatus, and computer programs to perform the actions of methods defined by instructions encoded on computer readable storage devices. These and other versions may optionally include one or more of the following features.

In some implementations, determining, based on the RRC message, the new random access channel (RACH) configuration comprises: determining a scaling factor based on the RRC message.

In some implementations, determining, based on the RRC message, the new random access channel (RACH) configuration comprises determining a frame-based offset based on the RRC message.

In some implementations, determining, based on the RRC message, the new random access channel (RACH) configuration comprises determining a slot/subframe-based offset based on the RRC message.

In some implementations, the scaling factor defines an adjustment to a periodicity included in an existing RACH configuration associated with the TAB node.

In some implementations, frame-based offset defines an adjustment to a frame number included in an existing RACH configuration associated with the IAB node, wherein the frame number identifies a frame containing backhaul traffic.

In some implementations, the subframe-based offset defines an adjustment to a subframe number included in an existing RACH configuration associated with the IAB node, wherein the subframe number identifies a subframe containing backhaul traffic.

In some implementations, the RRC message is a RACH-ConfigGeneric message.

In some implementations, the RRC message is a RACH-ConfigDedicated message.

In some implementations, the RRC message is a RACH-ConfigCommon message.

In accordance with another aspect of the present disclosure, in an integrated access and backhaul (IAB) network comprising an IAB node, a method includes determining a new random access channel (RACH) configuration for the IAB node; generating, in response to determining the RACH configuration for the IAB node, a message comprising the new RACH configuration for the IAB node; and transmitting the message to the IAB node.

Other versions include corresponding systems, apparatus, and computer programs to perform the actions of methods defined by instructions encoded on computer readable storage devices. These and other versions may optionally include one or more of the following features.

In some implementations, the new RACH configuration includes a scaling factor.

In some implementations, the new RACH configuration includes a frame-based offset.

In some implementations, the new RACH configuration includes a slot/subframe-based offset.

In some implementations, the message is a Radio Resource Control (RRC) message.

In some implementations, the RRC message is a RACH-ConfigGeneric message.

In some implementations, the RRC message is a RACH-ConfigDedicated message.

In some implementations, the RRC message is a RACH-ConfigCommon message.

DESCRIPTION OF DRAWINGS

FIG. 9 is a block diagram illustrating components able to read instructions from a machine-readable or computer-readable medium (e.g., a non-transitory machine-readable storage medium) and perform any one or more of the

DETAILED DESCRIPTION

The present disclosure is related to Integrated Access and Backhaul (IAB) networks, which is a feature that enables multi-hop routing (e.g., as described in 3GPP Release 16 (Rel-16)). An architecture of IAB networks generally includes an IAB donor that serves a plurality of IAB nodes that operate as relays. The IAB donor is a network node (e.g., a base station) that terminates new generation (NG) interfaces. In particular, the IAB donor may serve as an interface for a user equipment (UE) to a core network and/or may provide wireless backhauling functionality to the plurality of IAB nodes. The plurality of IAB nodes can serve as access nodes to UEs and can provide backhaul links to other IAB nodes.

The IAB network architecture implements a central unit-distributed unit (CU-DU) split. In this architecture, the plurality of IAB nodes terminate the DU functionality, and the IAB donor terminates the CU functionality. Furthermore, each IAB node may include a Mobile Termination (MT) function. An IAB node may use the MT function to connect to a parent IAB node and/or the IAB donor. Further, the IAB node may use the DU function to communicate with UEs and/or MTs of child IAB nodes. Signaling between the MTs of IAB nodes or UEs and the CU of the IAB donor may use the Radio Resource Control (RRC) protocol. Signaling between the DUs of IAB nodes and the CU of the IAB donor may use an F1-AP protocol.

Figure 1:
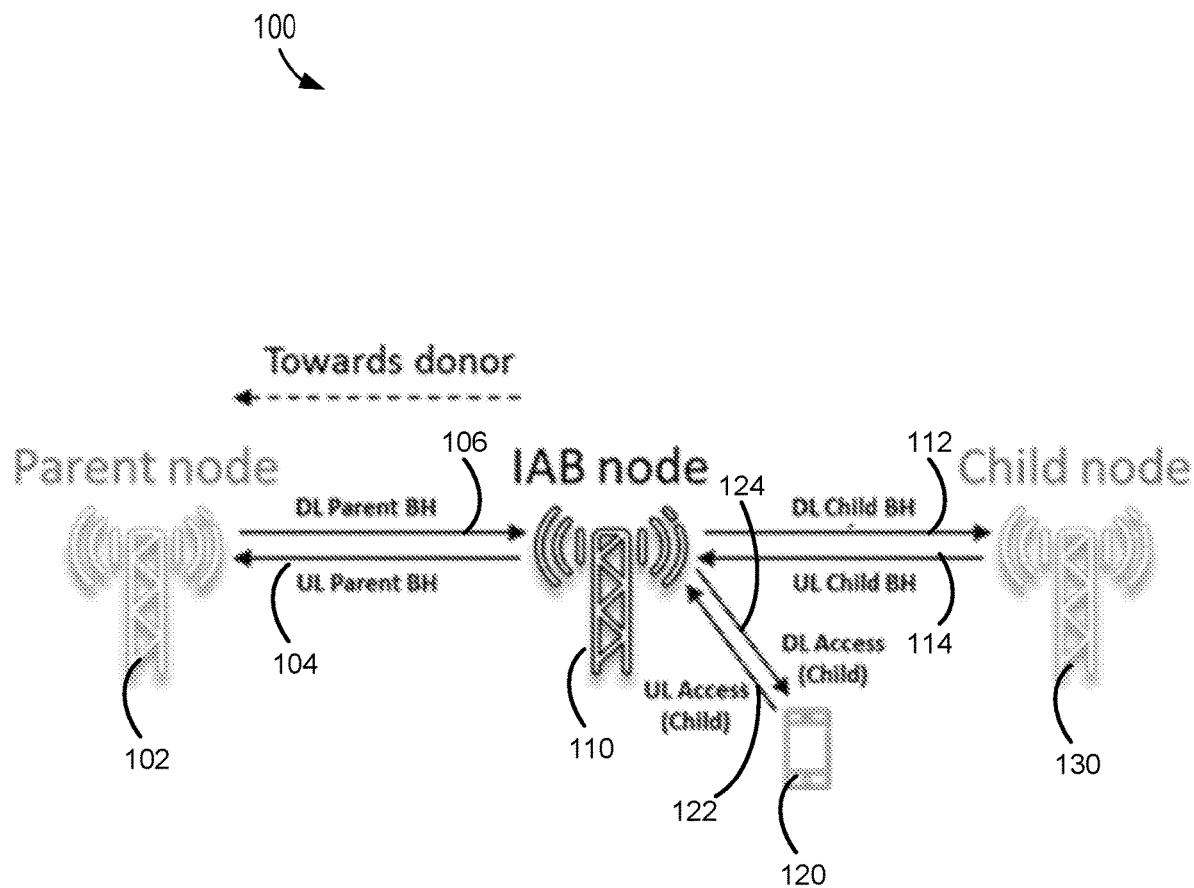
FIG. 1 is an example integrated access and backhaul (TAB) network, according to some implementations of the present disclosure.

FIG. 1A illustrates an example IAB network 100, according to some implementations. As shown in FIG. 1A, IAB network 100 includes parent node 102, IAB node 110, and child node 130. In the network 100, parent node 102 is a parent node of IAB node 110, and IAB node 110 is a parent of the UE 120 and the child node 130. Conversely, IAB node 110 is a child of parent node 102, and UE 120 is a child of IAB node 110. In IAB network 100, IAB node 110 and its parent node 102 (e.g., a donor IAB or another IAB node) may connect to each other through uplink (UL) backhaul (BH) link 104 and downlink (DL) BH link 106. In addition, child node 130 and IAB node 110 (its parent node) may connect to each other through uplink UL BH link 112 and DL BH link 114. Additionally, in IAB network 100, IAB node 110 and a child user equipment (UE) 120 may connect each other through an access (AC) links 122 and 124.

In IAB network 100, child nodes (e.g., 110) synchronize with parent nodes (e.g., 102) via a random access channel (RACH) between the nodes. In current 5G or New Radio (NR) specifications, an IAB node's RACH configuration determines the Physical RACH (PRACH) preamble format and the transmission timing it uses when performing a random access procedure with a parent IAB node. New RACH configurations specific to IAB nodes are derived with extension of existing Rel-15 RACH configurations obtained by scaling factor λ (if any), frame-based offset Δy (if any), slot/subframe-based offset Δs (if any) as follows.

The periodicity of a backhaul RACH configuration in frames takes the form x_iab=x*λ where: x is the periodicity of an existing RACH configuration, λ is a scaling factor taking values in {1, 2, 4, 8, 16, 32, 64} subject to the constraint x_iab≤64. The frame containing backhaul ROs is identified by $(n_{SFN}$ mod x_iab$)=((y+\Delta y)$ mod x_iab$)$ where Δy denotes a time offset in frames taking values in the range from 0 to x_iab−1. The subframe (slot) number for a RO of a backhaul RACH configuration is identified by (Sn+Δs,) mod L, where: Sn is the subframe (slot) number of an existing RACH configuration, Δs denotes a time offset in subframes (slots) taking values in the range from 0 to L−1, where L is the number of subframes (slots) in a frame.

Disclosed are methods and systems for communicating new RACH configurations including these parameters to IAB nodes in an IAB network (e.g., IAB network 100). In an embodiment, the scaling factor λ (if any), frame-based offset Δy (if any), slot/subframe-based offset Δs (if any), together with the PRACH configuration index (0-255), are determined in a centralized manner. New/additional RRC signaling is added to inform an IAB node of RACH scaling factor and offsets.

In an embodiment, additional fields are added to RRC information element (IE) RACH-ConfigGeneric to communicate the scaling factor, frame-based offset, and slot/subframe based offset to an IAB node. The IE RACH-ConfigGeneric may be configured as shown in Table 1. The field description of the fields used in the RRC signaling for a per-DU configuration is shown in Table 2.

TABLE 1

RACH-ConfigGeneric

```
RACH-ConfigGeneric ::=     SEQUENCE {
   prach-ConfigurationIndex    INTEGER (0..255),
   prach-ScalingFactor    ENUMERATED {1,2,4,8,16,32,64}    OPTIONAL,
   prach-FrameOffset    INTEGER (0..63)    OPTIONAL,
   prach-SubframeOffset    INTEGER (0..9)    OPTIONAL,
   prach-SlotOffset    INTEGER (0..maxNrofSlots)    OPTIONAL,
   msg1-FDM    ENUMERATED {one, two, four, eight},
   msg1-FrequencyStart    INTEGER (0..maxNrofPhysicalResourceBlocks-1),
   zeroCorrelationZoneConfig    INTEGER(0..15),
```

TABLE 1-continued

| RACH-ConfigGeneric |
| --- |
| preambleReceivedTargetPower    INTEGER (−202..−60),<br>preambleTransMax    ENUMERATED {n3, n4, n5, n6, n7, n8, n10, n20, n50, n100, n200},<br>powerRampingStep    ENUMERATED {dB0, dB2, dB4, dB6},<br>ra-ResponseWindow    ENUMERATED {s11, s12, s14, s18, s110, s120, s140, s180},<br>...<br>} |

TABLE 2

| RACH-ConfigGeneric field descriptions |
| --- |
| prach-ScalingFactor: Scaling factor λ of a backhaul RACH periodicity to an existing RACH configuration according to prach-ConfigurationIndex. The scaling factor taking values in {1, 2, 4, 8, 16, 32, 64} subject to the constraint x_iab = x * λ ≤ 64, where x is the periodicity of the existing RACH configuration.<br>prach-FrameOffset: Frame-based offset Δy of a backhaul RACH periodicity to an existing RACH configuration according to prach-ConfigurationIndex. The frame-based time offset takes values in the range from 0 to x_iab − 1.<br>prach-SubframeOffset: Subframe-based offset Δs of a backhaul RACH periodicity to an existing RACH configuration according to prach-ConfigurationIndex. The subframe-based time offset takes values in the range from 0 to 9, since there are ten subframes in a frame.<br>prach-SlotOffset: Slot-based offset Δs of a backhaul RACH periodicity to an existing RACH configuration according to prach-ConfigurationIndex. The slot-based time offset takes values in the range from 0 to L − 1, where L is the number of slots in a frame. |

In an embodiment, a cfra-IAB field may be added to RRC IE RACH-ConfigDedicated to indicate the scaling factor, frame-based offset, and slot/subframe based offset to an IAB node. A new RRC IE CFRA-IAB may also be created to include the detailed scaling factor and offsets information. The IE RACH-ConfigDedicated may be configured as shown in Table 3. The IE CFRA-IAB may be configured as shown in Table 4. The field description of the fields used in the RRC signaling are shown in Tables 5 and 6.

TABLE 3

| RACH-ConfigDedicated |
| --- |
| RACH-ConfigDedicated ::=    SEQUENCE {<br>  cfra    CFRA    OPTIONAL,<br>  cfra-IAB    CFRA-IAB    OPTIONAL,<br>  ra-Prioritization    RA-Prioritization    OPTIONAL,<br>  ...<br>} |

TABLE 4

| CFRA-IAB |
| --- |
| CFRA-IAB ::=    SEQUENCE {<br>  prach-ScalingFactor    ENUMERATED {1,2,4,8,16,32,64}    OPTIONAL,<br>  prach-FrameOffset    INTEGER (0..63)    OPTIONAL,<br>  prach-SubframeOffset    INTEGER (0..9)    OPTIONAL,<br>  prach-SlotOffset    INTEGER (0..maxNrofSlots)    OPTIONAL,<br>  ...<br>} |

TABLE 5

| RACH-ConfigDedicated field descriptions |
| --- |
| cfra-IAB: Indication of RACH configuration scaling factor and offsets specifically to an IAB node. |

TABLE 6

| CFRA-IAB field descriptions |
| --- |
| prach-ScalingFactor: Scaling factor λ of a backhaul RACH periodicity to an existing RACH configuration according to prach-ConfigurationIndex. The scaling factor taking values in {1, 2, 4, 8, 16, 32, 64} subject to the constraint x_iab = x * λ ≤ 64, where x is the periodicity of the existing RACH configuration.<br>prach-FrameOffset: Frame-based offset Δy of a backhaul RACH periodicity to an existing RACH configuration according to prach-ConfigurationIndex. The frame-based time offset takes values in the range from 0 to x_iab − 1.<br>prach-SubframeOffset: Subframe-based offset Δs of a backhaul RACH periodicity to an existing RACH configuration according to prach-ConfigurationIndex. The subframe-based time offset takes values in the range from 0 to 9, since there are ten subframes in a frame.<br>prach-SlotOffset: Slot-based offset Δs of a backhaul RACH periodicity to an existing RACH configuration according to prach-ConfigurationIndex. The slot-based time offset takes values in the range from 0 to L − 1, where L is the number of slots in a frame. |

In an embodiment, the RACH configuration scaling factor and offsets parameters are added to the RRC 1E RACH-ConfigDedicated as shown in Tables 7 and 8.

TABLE 7

RACH-ConfigDedicated

```
RACH-ConfigDedicated ::=     SEQUENCE {
  cfra         CFRA       OPTIONAL,
  prach-ScalingFactor      ENUMERATED {1,2,4,8,16,32,64 }    OPTIONAL,
  prach-FrameOffset        INTEGER (0..63)    OPTIONAL,
  prach-SubframeOffset     INTEGER (0..9)     OPTIONAL,
  prach-SlotOffset         INTEGER (0..maxNrofSlots)    OPTIONAL,
  ra-Prioritization        RA-Prioritization    OPTIONAL,
  ...
}
```

TABLE 8

RACH-ConfigDedicated field descriptions prach-ScalingFactor: Scaling factor λ of a
backhaul RACH periodicity to an existing RACH configuration
according to prach-ConfigurationIndex. The scaling
factor taking values in {1, 2, 4, 8, 16, 32, 64}
subject to the constraint x_iab = x * λ ≤ 64,
where x is the periodicity of the existing RACH configuration.
prach-FrameOffset: Frame-based offset Δy of a
backhaul RACH periodicity to an existing RACH configuration
according to prach-ConfigurationIndex. The frame-based
time offset takes values in the range from 0 to x_iab − 1.
prach-SubframeOffset: Subframe-based offset Δs of
a backhaul RACH periodicity to an existing RACH
configuration according to prach-ConfigurationIndex. The
subframe-based time offset takes values in the range
from 0 to 9, since there are ten subframes in a frame.
prach-SlotOffset: Slot-based offset Δs of a backhaul
RACH periodicity to an existing RACH configuration TABLE 8-continued RACH-ConfigDedicated field descriptions according to prach-ConfigurationIndex. The slot-
based time offset takes values in the range
from 0 to L − 1, where L
is the number of slots in a frame.

In an embodiment, a rach-ConfigGeneric-IAB field may be added to RRC IE RACH-ConfigCommon to indicate the scaling factor, frame-based offset, and slot/subframe based offset to an IAB node. A new RRC IE RACH-ConfigGeneric-IAB may also created to include the detailed scaling factor and offsets information. The IE RACH-ConfigCommon may be configured as shown in Table 9. The IE RACH-ConfigGeneric-IAB may be configured as shown in Table 10. The field description of the fields used in the RRC signaling are shown in Tables 11 and 12.

TABLE 9

RACH-ConfigCommon

```
RACH-ConfigCommon ::=       SEQUENCE {
  rach-ConfigGeneric        RACH-ConfigGeneric,
  rach-ConfigGeneric-IAB    RACH-ConfigGeneric-IAB,     OPTIONAL,
  totalNumberOfRA-Preambles    INTEGER (1..63)    OPTIONAL,
  ssb-perRACH-OccasionAndCB-PreamblesPerSSB    CHOICE {
    oneEighth    ENUMERATED
    {n4,n8,n12,n16,n20,n24,n28,n32,n36,n40,n44,n48,n52,n56,n60,n64},
    oneFourth    ENUMERATED
    {n4,n8,n12,n16,n20,n24,n28,n32,n36,n40,n44,n48,n52,n56,n60,n64},
    oneHalf     ENUMERATED
    {n4,n8,n12,n16,n20,n24,n28,n32,n36,n40,n44,n48,n52,n56,n60,n64},
    one         ENUMERATED
    {n4,n8,n12,n16,n20,n24,n28,n32,n36,n40,n44,n48,n52,n56,n60,n64},
    two         ENUMERATED {n4,n8,n12,n16,n20,n24,n28,n321,
    four        INTEGER (1..16),
    eight       INTEGER (1..8),
    sixteen     INTEGER (1..4)
  }    OPTIONAL,
  groupBconfigured    SEQUENCE {
    ra-Msg3SizeGroupA    ENUMERATED {b56, b144, b208, b256,
    b282, b480, b640, b800, b1000, b72, spare6, spare5,spare4, spare3, spare2,
    spare1},
    messagePowerOffsetGroupB    ENUMERATED { minusinfinity, dB0,
    dB5, dB8, dB10, dB12, dB15, dB18},
    numberOfRA-PreamblesGroupA    INTEGER (1..64)
  }    OPTIONAL,
  ra-ContentionResolutionTimer    ENUMERATED {sf8, sf16, sf24, sf32, sf40,
  sf48, 0'56, sf64},
  rsrp-ThresholdSSB       RSRP-Range    OPTIONAL,
  rsrp-ThresholdSSB-SUL   RSRP-Range    OPTIONAL,
  prach-RootSevenceIndex    CHOICE {
    1839    INTEGER (0..837),
    1139    INTEGER (0..137)
  },
```

TABLE 9-continued

RACH-ConfigCommon

```
    msg1-Subcarrier Spacing    SubcarrierSpacing    OPTIONAL,
    restrictedSetConfig    ENUMERATED {unrestrictedSet, restrictedSetTypeA,
    restrictedSetTypeB},
    msg3-transformPrecoder    ENUMERATED {enabled}    OPTIONAL,
}
```

TABLE 10

RACH-ConfigGeneric-IAB

```
RACH-ConfigGeneric-IAB ::=    SEQUENCE {
    prach-ScalingFactor    ENUMERATED {1,2,4,8,16,32,64}    OPTIONAL,
    prach-FrameOffset    INTEGER (0..63)    OPTIONAL,
    prach-SubframeOffset    INTEGER (0..9)    OPTIONAL,
    prach-SlotOffset    INTEGER (0..maxNrofSlots)    OPTIONAL,
    ...
}
```

TABLE 11

RACH-ConfigCommon field descriptions rach-ConfigGeneric-IAB

Indication of RACH configuration scaling factor and offsets specifically to an IAB node.

TABLE 12

RACH-ConfigGeneric-IAB field descriptions prach-ScalingFactor

Scaling factor $\lambda$ of a backhaul RACH periodicity to an existing RACH configuration according to prach-ConfigurationIndex. The scaling factor taking values in {1, 2, 4, 8, 16, 32, 64} subject to the constraint $x\_iab = x * \lambda \leq 64$, where x is the periodicity of the existing RACH configuration.

TABLE 12-continued

RACH-ConfigGeneric-IAB field descriptions prach-FrameOffset

Frame-based offset $\Delta y$ of a backhaul RACH periodicity to an existing RACH configuration according to prach-ConfigurationIndex. The frame-based time offset takes values in the range from 0 to $x\_iab - 1$.

prach-SubframeOffset

Subframe-based offset $\Delta s$ of a backhaul RACH periodicity to an existing RACH configuration according to prach-ConfigurationIndex. The subframe-based time offset takes values in the range from 0 to 9, since there are ten subframes in a frame.

prach-SlotOffset

Slot-based offset $\Delta s$ of a backhaul RACH periodicity to an existing RACH configuration according to prach-ConfigurationIndex. The slot-based time offset takes values in the range from 0 to L − 1, where L is the number of slots in a frame.

In an embodiment, RACH configuration scaling factor and offsets parameters can also be added to the RRC IE RACH-ConfigCommon directly, as shown in Tables 13 and 14:

TABLE 13

RACH-ConfigCommon

```
RACH-ConfigCommon ::=    SEQUENCE {
    racb-ConfigGeneric    RACH-ConfigGeneric,
    prach-ScalingFactor    ENUMERATED {1,2,4,8,16,32,64}    OPTIONAL,
    prach-FrameOffset    INTEGER (0..63)    OPTIONAL,
    prach-SubframeOffset    INTEGER (0..9)    OPTIONAL,
    prach-SlotOffset    INTEGER (0..maxNrofSlots)    OPTIONAL,
    ...
}
```

TABLE 14

RACH-ConfigCommon field descriptions prach-ScalingFactor

Scaling factor λ of a backhaul RACH periodicity to
an existing RACH configuration according to prach-ConfigurationIndex.
The scaling factor taking values in {1, 2, 4, 8, 16, 32, 64}
subject to the constraint x_iab = x * λ ≤ 64, where x is
the periodicity of the existing RACH configuration.

prach-FrameOffset

Frame-based offset Δy of a backhaul RACH periodicity to
an existing RACH configuration according to prach-ConfigurationIndex.
The frame-based time offset takes values in the range from 0 to x_iab − 1.

prach-SubframeOffset

Subframe-based offset Δs of a backhaul RACH periodicity to
an existing RACH configuration according to prach-ConfigurationIndex.
The subframe-based time offset takes values in the range from 0 to 9,
since there are ten subframes in a frame.

prach-SlotOffset

Slot-based offset Δs of a backhaul RACH periodicity to
an existing RACH configuration according to prach-ConfigurationIndex.
The slot-based time offset takes values in the range from 0 to L − 1,
where L is the number of slots in a frame.

Figure 2A:
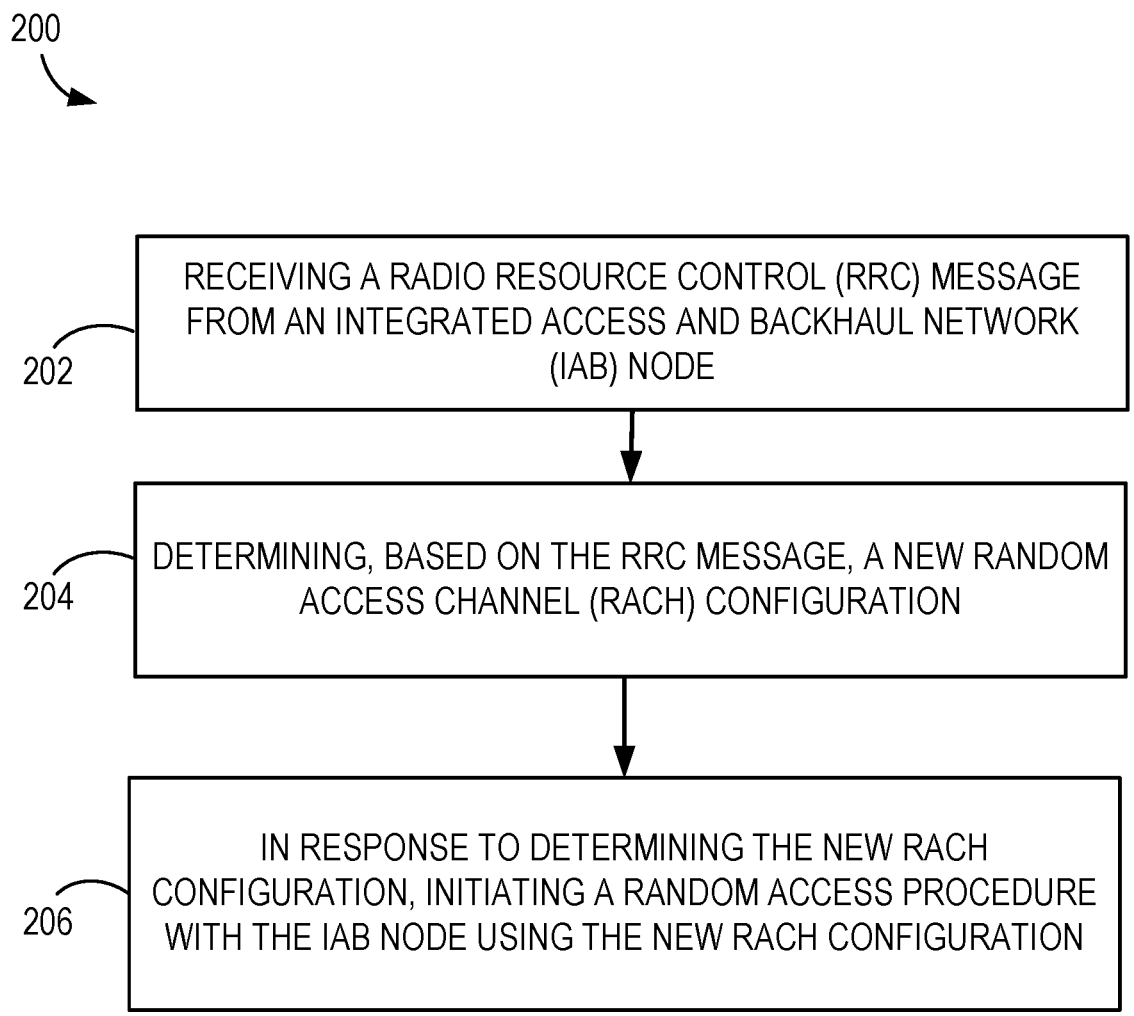
FIGS. 2A and 2B each illustrate an example method, according to some implementations of the present disclosure.
Figure 2B:
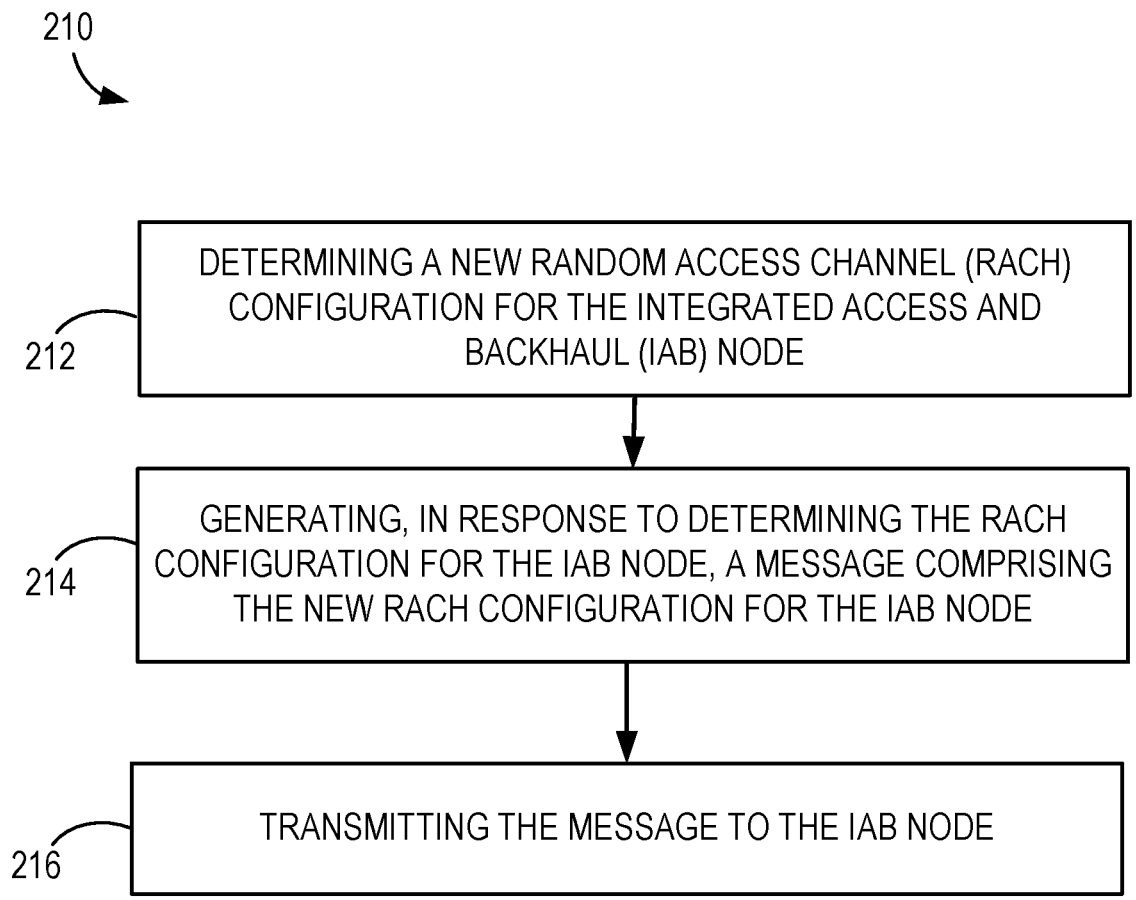

FIGS. 2A and 2B illustrate flowcharts of example processes, according to some implementations of the present disclosure. For clarity of presentation, the description that follows generally describes the processes in the context of the other figures in this description. As an example, process 200 can be performed by a base station (e.g., IAB donor) shown in FIG. 1A. As another example, process 210 can be performed by an IAB node shown in FIG. 1A. However, it will be understood that the processes may be performed, for example, by any suitable system, environment, software, and hardware, or a combination of systems, environments, software, and hardware, as appropriate. In some implementations, various steps of the processes can be run in parallel, in combination, in loops, or in any order.

FIG. 2A is a flowchart of an example process 200 for communicating new random access channel (RACH) configurations to integrated access and backhaul (IAB) nodes. At step 202, the process involves receiving a Radio Resource Control (RRC) message from an IAB node. At step 204, the process involves determining, based on the RRC message, a new random access channel (RACH) configuration. At step 206, the process involves, in response to determining the new RACH configuration, initiating a random access procedure with the IAB node using the new RACH configuration.

In some implementations, determining, based on the RRC message, the new random access channel (RACH) configuration comprises: determining a scaling factor based on the RRC message. In some implementations, determining, based on the RRC message, the new random access channel (RACH) configuration comprises determining a frame-based offset based on the RRC message. In some implementations, determining, based on the RRC message, the new random access channel (RACH) configuration comprises determining a slot/subframe-based offset based on the RRC message. In some implementations, the RRC message is a RACH-ConfigGeneric message. In some implementations, the RRC message is a RACH-ConfigDedicated message. In some implementations, the RRC message is a RACH-ConfigCommon message.

In some implementations, the scaling factor defines an adjustment to a periodicity included in an existing RACH configuration associated with the IAB node. In some implementations, frame-based offset defines an adjustment to a frame number included in an existing RACH configuration associated with the IAB node, wherein the frame number identifies a frame containing backhaul traffic. In some implementations, the subframe-based offset defines an adjustment to a subframe number included in an existing RACH configuration associated with the IAB node, wherein the subframe number identifies a subframe containing backhaul traffic.

FIG. 2B is a flowchart of an example process 210. At step 212, the process involves determining a new random access channel (RACH) configuration for the IAB node. At step 214, the process involves generating, in response to determining the RACH configuration for the IAB node, a message comprising the new RACH configuration for the IAB node. At step 216, the process involves transmitting the message to the IAB node.

In some implementations, the new RACH configuration includes a scaling factor. In some implementations, the new RACH configuration includes a frame-based offset. In some implementations, the new RACH configuration includes a slot/subframe-based offset. In some implementations, the message is a Radio Resource Control (RRC) message. In some implementations, the RRC message is a RACH-ConfigGeneric message. In some implementations, the RRC message is a RACH-ConfigDedicated message. In some implementations, the RRC message is a RACH-ConfigCommon message.

The example processes shown in FIGS. 2A and 2B can be modified or reconfigured to include additional, fewer, or different steps (not shown in FIGS. 2A and 2B), which can be performed in the order shown or in a different order.

Figure 3:
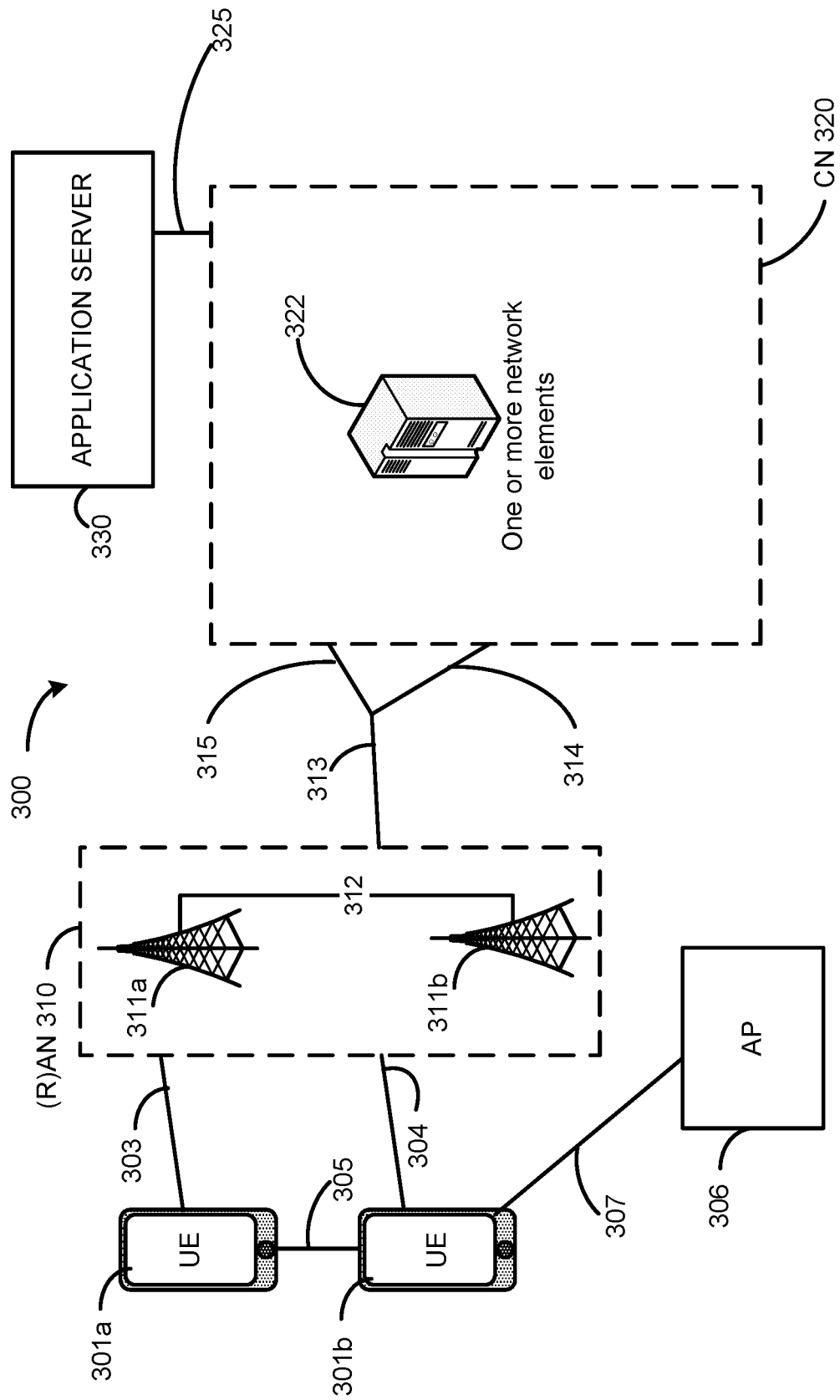
FIG. 3 is an example architecture of a system of a network, according to some implementations of the present disclosure.

FIG. 3 illustrates an example architecture of a system 300 of a network, in accordance with various embodiments. The following description is provided for an example system 300 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 3, the system 300 includes UE 301a and UE 301b (collectively referred to as "UEs 301" or "UE 301"). In this example, UEs 301 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 301 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 may be configured to connect, for example, communicatively couple, with a RAN 310. In embodiments, the RAN 310 may be an NG RAN or a 5G RAN, an E-UTRAN, or a legacy RAN, such as a UTRAN or GERAN. As used herein, the term "NG RAN" or the like may refer to a RAN 310 that operates in an NR or 5G system 300, and the term "E-UTRAN" or the like may refer to a RAN 310 that operates in an LTE or 4G system 300. The UEs 301 utilize connections (or channels) 303 and 304, respectively, each of which comprises a physical communications interface or layer (discussed in further detail below).

In this example, the connections 303 and 304 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 301 may directly exchange communication data via a ProSe interface 305. The ProSe interface 305 may alternatively be referred to as a SL interface 305 and may comprise one or more logical channels, including but not limited to a PSCCH, a PSSCH, a PSDCH, and a PSBCH.

The UE 301b is shown to be configured to access an AP 306 (also referred to as "WLAN node 306," "WLAN 306," "WLAN Termination 306," "WT 306" or the like) via connection 307. The connection 307 can comprise a local wireless connection, such as a connection consistent with any IEEE 802.11 protocol, wherein the AP 306 would comprise a wireless fidelity (Wi-Fi®) router. In this example, the AP 306 is shown to be connected to the Internet without connecting to the core network of the wireless system (described in further detail below). In various embodiments, the UE 301b, RAN 310, and AP 306 may be configured to utilize LWA operation and/or LWIP operation. The LWA operation may involve the UE 301b in RRC_CONNECTED being configured by a RAN node 311a-b to utilize radio resources of LTE and WLAN. LWIP operation may involve the UE 301b using WLAN radio resources (e.g., connection 307) via IPsec protocol tunneling to authenticate and encrypt packets (e.g., IP packets) sent over the connection 307. IPsec tunneling may include encapsulating the entirety of original IP packets and adding a new packet header, thereby protecting the original header of the IP packets.

The RAN 310 can include one or more AN nodes or RAN nodes 311a and 311b (collectively referred to as "RAN nodes 311" or "RAN node 311") that enable the connections 303 and 304. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 311 that operates in an NR or 5G system 300 (for example, a gNB), and the term "E-UTRAN node" or the like may refer to a RAN node 311 that operates in an LTE or 4G system 300 (e.g., an eNB). According to various embodiments, the RAN nodes 311 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 311 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 311; a MAC/PHY split wherein RRC, PDCP, RLC, and MAC layers are operated by the CRAN/vBBUP and the PHY layer is operated by individual RAN nodes 311; or a "lower PHY" split wherein RRC, PDCP, RLC, MAC layers and upper portions of the PHY layer are operated by the CRAN/vBBUP and lower portions of the PHY layer are operated by individual RAN nodes 311. This virtualized framework allows the freed-up processor cores of the RAN nodes 311 to perform other virtualized applications. In some implementations, an individual RAN node 311 may represent individual gNB-DUs that are connected to a gNB-CU via individual F 1 interfaces (not shown by FIG. 3). In these implementations, the gNB-DUs may include one or more remote radio heads or RFEMs (see, e.g., FIG. 5), and the gNB-CU may be operated by a server that is located in the RAN 310 (not shown) or by a server pool in a similar manner as the CRAN/vBBUP. Additionally or alternatively, one or more of the RAN nodes 311 may be next generation eNBs (ng-eNBs), which are RAN nodes that provide E-UTRA user plane and control plane protocol terminations toward the UEs 301, and are connected to a 5GC via an NG interface (discussed infra).

In V2X scenarios one or more of the RAN nodes 311 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 301 (vUEs 301). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 311 can terminate the air interface protocol and can be the first point of contact for the UEs 301. In some embodiments, any of the RAN nodes 311 can fulfill various logical functions for the RAN 310 including, but not limited to, radio network controller (RNC) functions such as radio bearer management, uplink and downlink dynamic radio resource management and data packet scheduling, and mobility management.

In embodiments, the UEs 301 can be configured to communicate using OFDM communication signals with each other or with any of the RAN nodes 311 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 to the UEs 301, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 301 and the RAN nodes 311 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 301 and the RAN nodes 311 may operate using LAA, eLAA, and/or feLAA mechanisms. In these implementations, the UEs 301 and the RAN nodes 311 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 301 RAN nodes 311, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 301, AP 306, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 301 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 301. The PDCCH carries information about the transport format and resource allocations related to the PDSCH channel, among other things. It may also inform the UEs 301 about the transport format, resource allocation, and HARQ information related to the uplink shared channel. Typically, downlink scheduling (assigning control and shared channel resource blocks to the UE 301b within a cell) may be performed at any of the RAN nodes 311 based on channel quality information fed back from any of the UEs 301. The downlink resource assignment information may be sent on the PDCCH used for (e.g., assigned to) each of the UEs 301.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 311 may be configured to communicate with one another via interface 312. In embodiments where the system 300 is an LTE system (e.g., when CN 320 is an EPC 420 as in FIG. 4), the interface 312 may be an X2 interface 312. The X2 interface may be defined between two or more RAN nodes 311 (e.g., two or more eNBs and the like) that connect to EPC 320, and/or between two eNBs connecting to EPC 320. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 301 from an SeNB for user data; information of PDCP PDUs that were not delivered to a UE 301; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 300 is a 5G or NR system, the interface 312 may be an Xn interface 312. The Xn interface is defined between two or more RAN nodes 311 (e.g., two or more gNBs and the like) that connect to 5GC 320, between a RAN node 311 (e.g., a gNB) connecting to 5GC 320 and an eNB, and/or between two eNBs connecting to 5GC 320. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 301 in a connected mode (e.g., CM-CONNECTED) including functionality to manage the UE mobility for connected mode between one or more RAN nodes 311. The mobility support may include context transfer from an old (source) serving RAN node 311 to new (target) serving RAN node 311; and control of user plane tunnels between old (source) serving RAN node 311 to new (target) serving RAN node 311. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 310 is shown to be communicatively coupled to a core network—in this embodiment, core network (CN) 320. The CN 320 may comprise a plurality of network elements 322, which are configured to offer various data and telecommunications services to customers/subscribers (e.g., users of UEs 301) who are connected to the CN 320 via the RAN 310. The components of the CN 320 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 320 may be referred to as a network slice, and a logical instantiation of a portion of the CN 320 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 330 may be an element offering applications that use IP bearer resources with the core network (e.g., UMTS PS domain, LTE PS data services, etc.). The application server 330 can also be configured to support one or more communication services (e.g., VoIP sessions, PTT sessions, group communication sessions, social networking services, etc.) for the UEs 301 via the EPC 320.

In embodiments, the CN 320 may be a 5GC (referred to as "5GC 320" or the like), and the RAN 310 may be connected with the CN 320 via an NG interface 313. In embodiments, the NG interface 313 may be split into two parts, an NG user plane (NG-U) interface 314, which carries traffic data between the RAN nodes 311 and a UPF, and the S1 control plane (NG-C) interface 315, which is a signaling interface between the RAN nodes 311 and AMFs.

In embodiments, the CN 320 may be a 5G CN (referred to as "5GC 320" or the like), while in other embodiments, the CN 320 may be an EPC). Where CN 320 is an EPC (referred to as "EPC 320" or the like), the RAN 310 may be connected with the CN 320 via an S1 interface 313. In embodiments, the S1 interface 313 may be split into two parts, an S1 user plane (S1-U) interface 314, which carries traffic data between the RAN nodes 311 and the S-GW, and the S1-MME interface 315, which is a signaling interface between the RAN nodes 311 and MMEs.

Figure 4:
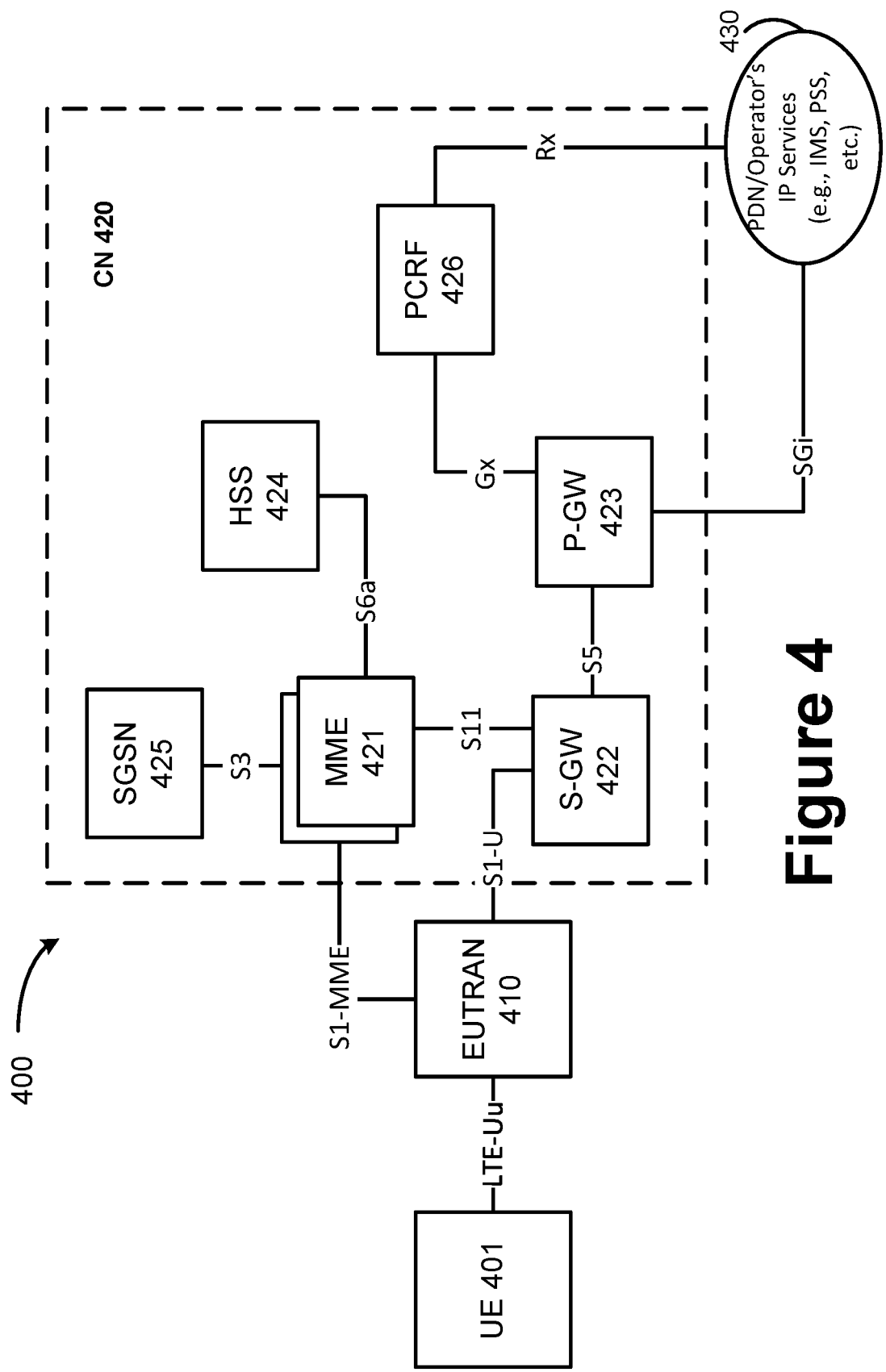
FIG. 4 illustrates an example architecture of a system including a CN, according to some implementations of the present disclosure.

FIG. 4 illustrates an example architecture of a system 400 including a first CN 420, in accordance with various embodiments. In this example, system 400 may implement the LTE standard wherein the CN 420 is an EPC 420 that corresponds with CN 320 of FIG. 3. Additionally, the UE 401 may be the same or similar as the UEs 301 of FIG. 3, and the E-UTRAN 410 may be a RAN that is the same or similar to the RAN 310 of FIG. 3, and which may include RAN nodes 311 discussed previously. The CN 420 may comprise MMEs 421, an S-GW 422, a P-GW 423, a HSS 424, and a SGSN 425.

The MMEs 421 may be similar in function to the control plane of legacy SGSN, and may implement MM functions to keep track of the current location of a UE 401. The MMEs 421 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 401, provide user identity confidentiality, and/or perform other like services to users/subscribers. Each UE 401 and the MME 421 may include an MM or EMM sublayer, and an MM context may be established in the UE 401 and the MME 421 when an attach procedure is successfully completed. The MM context may be a data structure or database object that stores MM-related information of the UE 401. The MMEs 421 may be coupled with the HSS 424 via an S6a reference point, coupled with the SGSN 425 via an S3 reference point, and coupled with the S-GW 422 via an S11 reference point.

The SGSN 425 may be a node that serves the UE 401 by tracking the location of an individual UE 401 and performing security functions. In addition, the SGSN 425 may perform Inter-EPC node signaling for mobility between 2G/3G and E-UTRAN 3GPP access networks; PDN and S-GW selection as specified by the MMEs 421; handling of UE 401 time zone functions as specified by the MMEs 421; and MME selection for handovers to E-UTRAN 3GPP access network. The S3 reference point between the MMEs 421 and the SGSN 425 may enable user and bearer information exchange for inter-3GPP access network mobility in idle and/or active states.

The HSS 424 may comprise a database for network users, including subscription-related information to support the network entities' handling of communication sessions. The EPC 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc. An S6a reference point between the HSS 424 and the MMEs 421 may enable transfer of subscription and authentication data for authenticating/authorizing user access to the EPC 420 between HSS 424 and the MMEs 421.

The S-GW 422 may terminate the S1 interface 313 ("S1-U" in FIG. 4) toward the RAN 410, and routes data packets between the RAN 410 and the EPC 420. In addition, the S-GW 422 may be a local mobility anchor point for inter-RAN node handovers and also may provide an anchor for inter-3GPP mobility. Other responsibilities may include lawful intercept, charging, and some policy enforcement. The S11 reference point between the S-GW 422 and the MMEs 421 may provide a control plane between the MMEs 421 and the S-GW 422. The S-GW 422 may be coupled with the P-GW 423 via an S5 reference point.

The P-GW 423 may terminate an SGi interface toward a PDN 430. The P-GW 423 may route data packets between the EPC 420 and external networks such as a network including the application server 330 (alternatively referred to as an "AF") via an IP interface 325 (see e.g., FIG. 3). In embodiments, the P-GW 423 may be communicatively coupled to an application server (application server 330 of FIG. 3 or PDN 430 in FIG. 4) via an IP communications interface 325 (see, e.g., FIG. 3). The S5 reference point between the P-GW 423 and the S-GW 422 may provide user plane tunneling and tunnel management between the P-GW 423 and the S-GW 422. The S5 reference point may also be used for S-GW 422 relocation due to UE 401 mobility and if the S-GW 422 needs to connect to a non-collocated P-GW 423 for the required PDN connectivity. The P-GW 423 may further include a node for policy enforcement and charging data collection (e.g., PCEF (not shown)). Additionally, the SGi reference point between the P-GW 423 and the packet data network (PDN) 430 may be an operator external public, a private PDN, or an intra operator packet data network, for example, for provision of IMS services. The P-GW 423 may be coupled with a PCRF 426 via a Gx reference point.

PCRF 426 is the policy and charging control element of the EPC 420. In a non-roaming scenario, there may be a single PCRF 426 in the Home Public Land Mobile Network (HPLMN) associated with a UE 401's Internet Protocol Connectivity Access Network (IP-CAN) session. In a roaming scenario with local breakout of traffic, there may be two PCRFs associated with a UE 401's IP-CAN session, a Home PCRF (H-PCRF) within an HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate QoS and charging parameters. The PCRF 426 may provision this rule into a PCEF (not shown) with the appropriate TFT and QCI, which commences the QoS and charging as specified by the application server 430. The Gx reference point between the PCRF 426 and the P-GW 423 may allow for the transfer of QoS policy and charging rules from the PCRF 426 to PCEF in the P-GW 423. An Rx reference point may reside between the PDN 430 (or "AF 430") and the PCRF 426.

Figure 5:
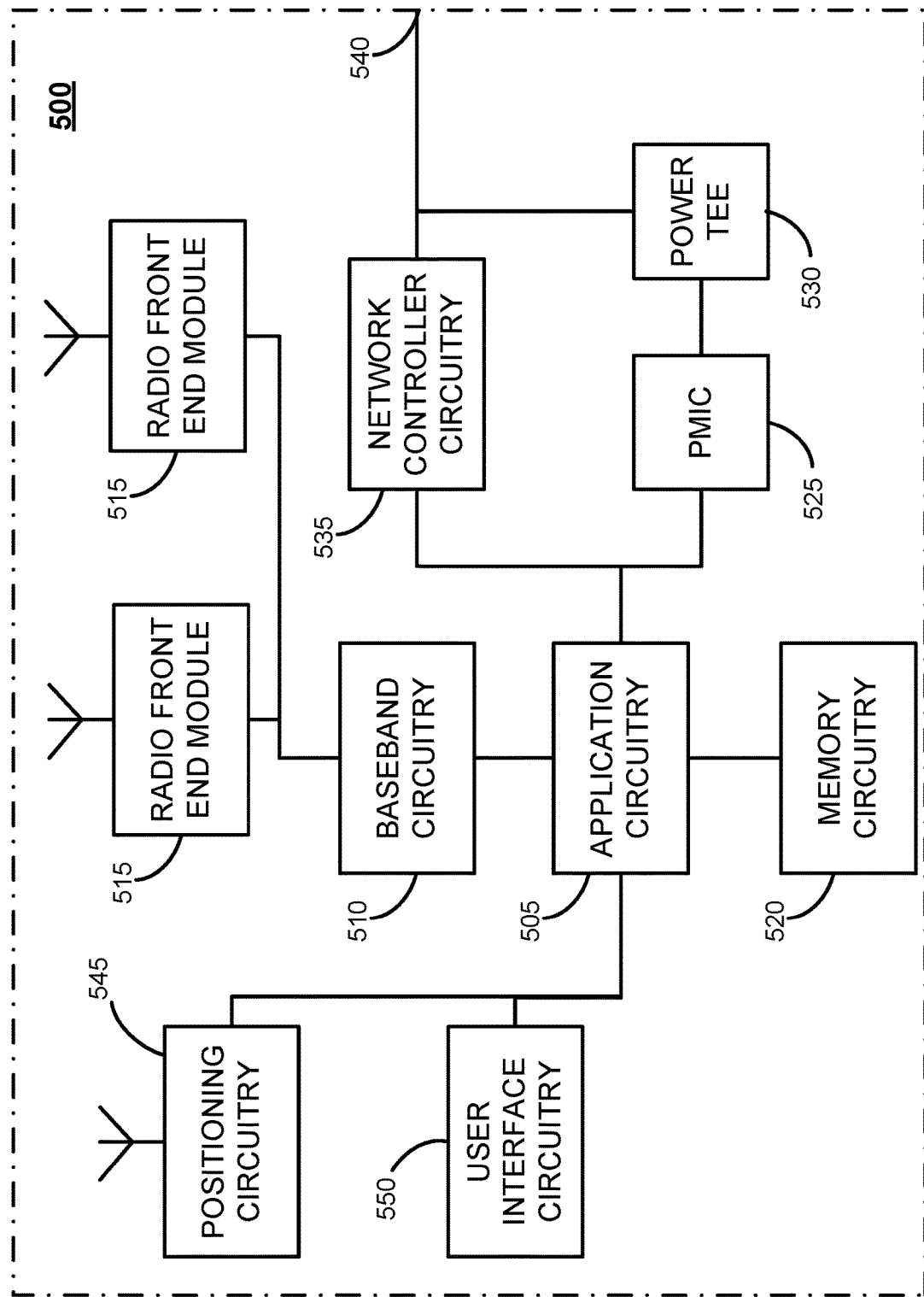
FIG. 5 is a block diagram of an example of infrastructure equipment, according to some implementations of the present disclosure.

FIG. 5 illustrates an example of infrastructure equipment 500 in accordance with various embodiments. The infrastructure equipment 500 (or "system 500") may be implemented as a base station, radio head, RAN node such as the RAN nodes 311 and/or AP 306 shown and described previously, application server(s) 330, and/or any other element/device discussed herein. In other examples, the system 500 could be implemented in or by a UE.

The system 500 includes application circuitry 505, baseband circuitry 510, one or more radio front end modules (RFEMs) 515, memory circuitry 520, power management integrated circuitry (PMIC) 525, power tee circuitry 530, network controller circuitry 535, network interface connector 540, satellite positioning circuitry 545, and user interface circuitry 550. In some embodiments, the device 500 may include 5 additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 505 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or TO), memory card controllers such as Secure Digital (SD) MultiMediaCard (MMC) or similar, Universal Serial Bus (USB) interfaces, Mobile Industry Processor Interface (MTPI) interfaces and Joint Test Access Group (JTAG) test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 505 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 505 may comprise, or may be, a special-purpose processor/controller to operate according to the various embodiments herein. As examples, the processor(s) of application circuitry 505 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 500 may not utilize application circuitry 505, and instead may include a special-purpose processor/controller to process IP data received from an EPC or 5GC, for example. In some implementations, the application circuitry 505 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASTCs such as structured ASTCs and the like; programmable SoCs (PSoCs); and the like. In such implementations, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 7.

User interface circuitry 550 may include one or more user interfaces designed to enable user interaction with the system 500 or peripheral component interfaces designed to enable peripheral component interaction with the system 500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 530 may provide for electrical power drawn from a network cable to provide both power supply and data connectivity to the infrastructure equipment 500 using a single cable.

The network controller circuitry 535 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 500 via network interface connector 540 using a physical connection, which may be electrical (commonly referred to as a "copper interconnect"), optical, or wireless. The network controller circuitry 535 may include one or more dedicated processors and/or FPGAs to communicate using one or more of the aforementioned protocols. In some implementations, the network controller circuitry 535 may include multiple controllers to provide connectivity to other networks using the same or different protocols.

The positioning circuitry 545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-Technology for Positioning, Navigation, and Timing (Micro-PNT) IC that uses a master timing clock to perform position tracking/estimation without GNSS assistance. The positioning circuitry 545 may also be part of, or interact with, the baseband circuitry 510 and/or RFEMs 515 to communicate with the nodes and components of the positioning network. The positioning circuitry 545 may also provide position data and/or time data to the application circuitry 505, which may use the data to synchronize operations with various infrastructure (e.g., RAN nodes 311, etc.), or the like.

The components shown by FIG. 5 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/1× systems may be included, such as an I2C interface, an SPI interface, point to point interfaces, and a power bus, among others.

Figure 6:
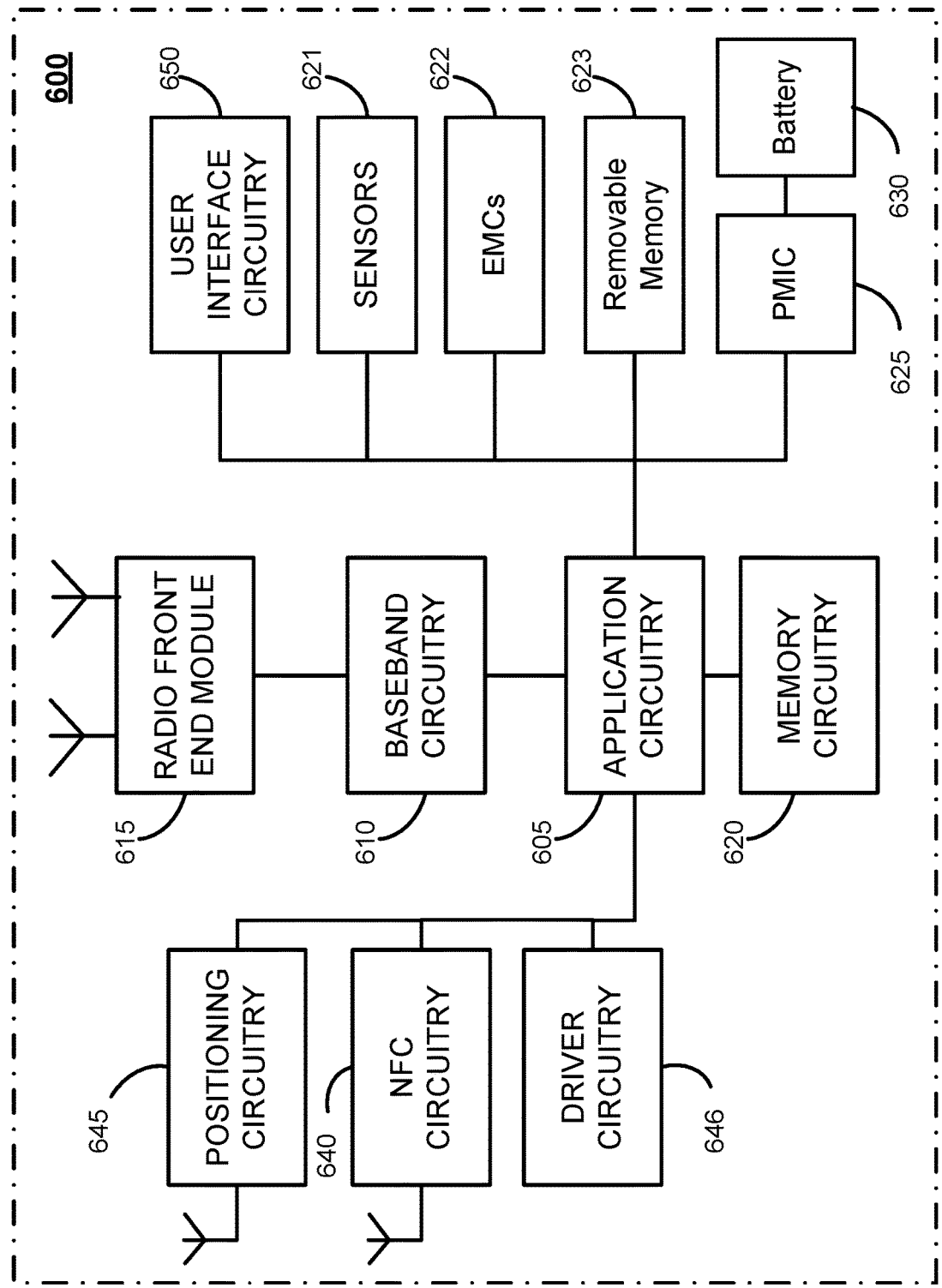
FIG. 6 is a block diagram of an example of platform, according to some implementations of the present disclosure.

FIG. 6 illustrates an example of a platform 600 (or "device 600") in accordance with various embodiments. In embodiments, the computer platform 600 may be suitable for use as UEs 301, 401 application servers 330, and/or any other element/device discussed herein. The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 6 is intended to show a high level view of components of the computer platform 600. However, some of the components shown may be omitted, additional components may be present, and different arrangement of the components shown may occur in other implementations.

Application circuitry 605 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 505 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 505 may comprise, or may be, a special-purpose processor/controller to operate according to the various embodiments herein.

As examples, the processor(s) of application circuitry 605 may include an Apple A-series processor. The processors of the application circuitry 1105 may also be one or more of Intel® Architecture Core™ based processor, such as a Quark™ an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 605 may be a part of a system on a chip (SoC) in which the application circuitry 605 and other components are formed into a single integrated circuit, or a single package.

Additionally or alternatively, application circuitry 605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 610 are discussed infra with regard to FIG. 7.

The RFEMs 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 615, which incorporates both mmWave antennas and sub-mmWave.

The memory circuitry 620 may include any number and type of memory devices used to provide for a given amount of system memory. As examples, the memory circuitry 620 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 620 may be developed in accordance with a Joint Electron Devices Engineering Council (JEDEC) low power double data rate (LPDDR)-based design, such as LPDDR2, LPDDR3, LPDDR4, or the like. Memory circuitry 620 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 620 may be on-die memory or registers associated with the application circuitry 605. To provide for persistent storage of information such as data, applications, operating systems and so forth, memory circuitry 620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 600 may incorporate the three-dimensional (3D) cross-point (XPOINT) memories from Intel® and Micron®.

Removable memory circuitry 623 may include devices, circuitry, enclosures/housings, ports or receptacles, etc. used to couple portable data storage devices with the platform 600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 600 may also include interface circuitry (not shown) that is used to connect external devices with the platform 600. The external devices connected to the platform 600 via the interface circuitry include sensor circuitry 621 and electro-mechanical components (EMCs) 622, as well as removable memory devices coupled to removable memory circuitry 623.

The sensor circuitry 621 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 622 include devices, modules, or subsystems whose purpose is to enable platform 600 to change its state, position, and/or orientation, or move or control a mechanism or (sub)system. Additionally, EMCs 622 may be configured to generate and send messages/signaling to other components of the platform 600 to indicate a current state of the EMCs 622. Examples of the EMCs 622 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 600 is configured to operate one or more EMCs 622 based on one or more captured events and/or instructions or control signals received from a service provider and/or various clients.

In some implementations, the interface circuitry may connect the platform 600 with positioning circuitry 645. The positioning circuitry 645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-PNT IC that uses a master timing clock to perform position tracking/estimation without GNSS assistance. The positioning circuitry 645 may also be part of, or interact with, the baseband circuitry 510 and/or RFEMs 615 to communicate with the nodes and components of the positioning network. The positioning circuitry 645 may also provide position data and/or time data to the application circuitry 605, which may use the data to synchronize operations with various infrastructure (e.g., radio base stations), for turn-by-turn navigation applications, or the like.

In some implementations, the interface circuitry may connect the platform 600 with Near-Field Communication (NFC) circuitry 640. NFC circuitry 640 is configured to provide contactless, short-range communications based on radio frequency identification (RFID) standards, wherein magnetic field induction is used to enable communication between NFC circuitry 640 and NFC-enabled devices external to the platform 600 (e.g., an "NFC touchpoint"). NFC circuitry 640 comprises an NFC controller coupled with an antenna element and a processor coupled with the NFC controller. The NFC controller may be a chip/IC providing NFC functionalities to the NFC circuitry 640 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 640, or initiate data transfer between the NFC circuitry 640 and another active NFC device (e.g., a smartphone or an NFC-enabled POS terminal) that is proximate to the platform 600.

The driver circuitry 646 may include software and hardware elements that operate to control particular devices that are embedded in the platform 600, attached to the platform 600, or otherwise communicatively coupled with the platform 600. The driver circuitry 646 may include individual drivers allowing other components of the platform 600 to interact with or control various input/output (I/O) devices that may be present within, or connected to, the platform 600. For example, driver circuitry 646 may include a display driver to control and allow access to a display device, a touchscreen driver to control and allow access to a touchscreen interface of the platform 600, sensor drivers to obtain sensor readings of sensor circuitry 621 and control and allow access to sensor circuitry 621, EMC drivers to obtain actuator positions of the EMCs 622 and/or control and allow access to the EMCs 622, a camera driver to control and allow access to an embedded image capture device, audio drivers to control and allow access to one or more audio devices.

The power management integrated circuitry (PMIC) 625 (also referred to as "power management circuitry 625") may manage power provided to various components of the platform 600. In particular, with respect to the baseband circuitry 610, the PMIC 625 may control power-source selection, voltage scaling, battery charging, or DC-to-DC conversion. The PMIC 625 may often be included when the platform 600 is capable of being powered by a battery 630, for example, when the device is included in a UE 301, 401.

In some embodiments, the PMIC 625 may control, or otherwise be part of, various power saving mechanisms of the platform 600. For example, if the platform 600 is in an RRC_Connected state, where it is still connected to the RAN node as it expects to receive traffic shortly, then it may enter a state known as Discontinuous Reception Mode (DRX) after a period of inactivity. During this state, the platform 600 may power down for brief intervals of time and thus save power. If there is no data traffic activity for an extended period of time, then the platform 600 may transition off to an RRC_Idle state, where it disconnects from the network and does not perform operations such as channel quality feedback, handover, etc. The platform 600 goes into a very low power state and it performs paging where again it periodically wakes up to listen to the network and then powers down again. The platform 600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block XS30 may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 650 includes various input/output (I/O) devices present within, or connected to, the platform 600, and includes one or more user interfaces designed to enable user interaction with the platform 600 and/or peripheral component interfaces designed to enable peripheral component interaction with the platform 600. The user interface circuitry 650 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 600. The output device circuitry may also include speakers or other audio emitting devices, printer(s), and/or the like. In some embodiments, the sensor circuitry 621 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 600 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 7:
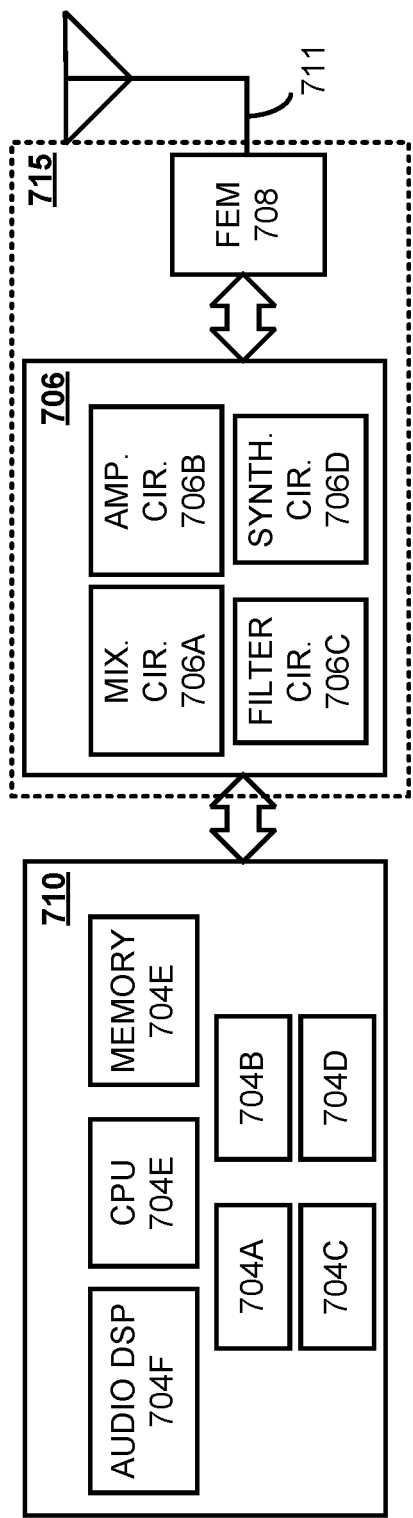
FIG. 7 is a block diagram of an example of components of baseband circuitry and radio front end modules (RFEM), according to some implementations of the present disclosure.

FIG. 7 illustrates example components of baseband circuitry 710 and radio front end modules (RFEM) 715 in accordance with various embodiments. The baseband circuitry 710 corresponds to the baseband circuitry 510 and 610 of FIGS. 5 and 6, respectively. The RFEM 715 corresponds to the RFEM 515 and 615 of FIGS. 5 and 6, respectively. As shown, the RFEMs 715 may include Radio Frequency (RF) circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 505/605 (see FIGS. 5 and 6) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 505/605 of FIGS. 5-7); an RF circuitry interface to send/receive data to/from RF circuitry 706 of FIG. 7; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 625.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 505/605 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the application circuitry 505/605 depending on the desired output frequency. In some embodiments, a divider control input (e.g., N) may be determined from a look-up table based on a channel indicated by the application circuitry 505/605.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Processors of the application circuitry 505/605 and processors of the baseband circuitry 710 may be used to execute elements of one or more instances of a protocol stack. For example, processors of the baseband circuitry 710, alone or in combination, may be used execute Layer 3, Layer 2, or Layer 1 functionality, while processors of the application circuitry 505/605 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 8:
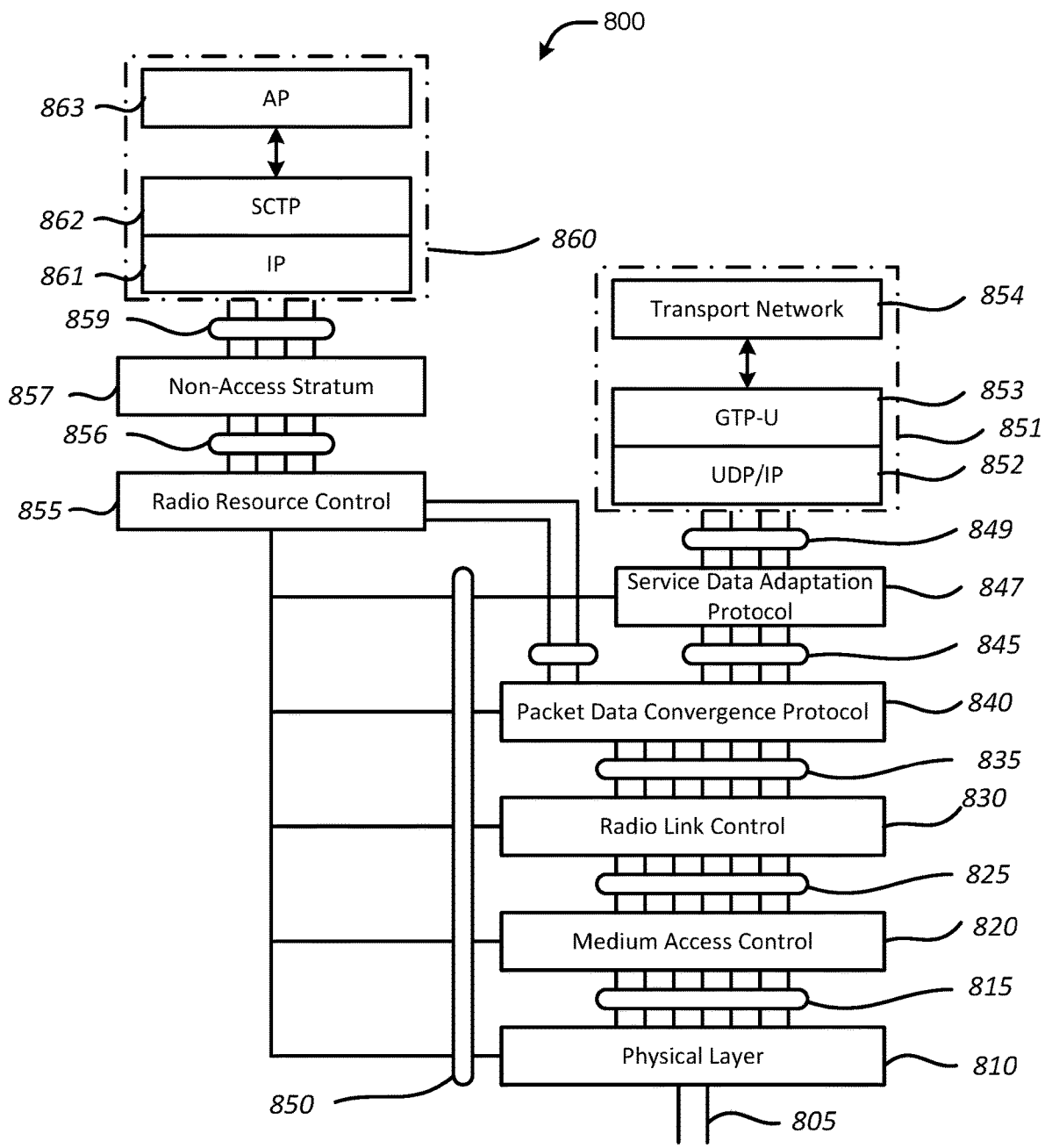
FIG. 8 is a block diagram of various protocol functions that may be implemented in a wireless communication device, according to some implementations of the present disclosure.

FIG. 8 illustrates various protocol functions that may be implemented in a wireless communication device according to various embodiments. In particular, FIG. 8 includes an arrangement 800 showing interconnections between various protocol layers/entities. The following description of FIG. 8 is provided for various protocol layers/entities that operate in conjunction with the 5G/NR system standards and LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may comprise one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 810 may process requests from and provide indications to an instance of MAC 820 via one or more PHY-SAP 815. According to some embodiments, requests and indications communicated via PHY-SAP 815 may comprise one or more transport channels.

Instance(s) of MAC 820 may process requests from, and provide indications to, an instance of RLC 830 via one or more MAC-SAPs 825. These requests and indications communicated via the MAC-SAP 825 may comprise one or more logical channels. The MAC 820 may perform mapping between the logical channels and transport channels, multiplexing of MAC SDUs from one or more logical channels onto TBs to be delivered to PHY 810 via the transport channels, de-multiplexing MAC SDUs to one or more logical channels from TBs delivered from the PHY 810 via transport channels, multiplexing MAC SDUs onto TBs, scheduling information reporting, error correction through HARQ, and logical channel prioritization.

Instance(s) of RLC 830 may process requests from and provide indications to an instance of PDCP 840 via one or more radio link control service access points (RLC-SAP) 835. These requests and indications communicated via RLC-SAP 835 may comprise one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may comprise one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 847 may process requests from and provide indications to one or more higher layer protocol entities via one or more SDAP-SAP 849. These requests and indications communicated via SDAP-SAP 849 may comprise one or more QoS flows. The SDAP 847 may map QoS flows to DRBs, and vice versa, and may also mark QFIs in DL and UL packets. A single SDAP entity 847 may be configured for an individual PDU session. In the UL direction, the NG-RAN 310 may control the mapping of QoS Flows to DRB(s) in two different ways, reflective mapping or explicit mapping. For reflective mapping, the SDAP 847 of a UE 301 may monitor the QFIs of the DL packets for each DRB, and may apply the same mapping for packets flowing in the UL direction. For a DRB, the SDAP 847 of the UE 301 may map the UL packets belonging to the QoS flows(s) corresponding to the QoS flow ID(s) and PDU session observed in the DL packets for that DRB. To enable reflective mapping, the NG-RAN may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In embodiments, the SDAP 847 may only be used in NR implementations and may not be used in LTE implementations.

The RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC-SAPs 856. The main services and functions of the RRC 855 may include broadcast of system information (e.g., included in MTBs or SIBs related to the NAS), broadcast of system information related to the access stratum (AS), paging, establishment, maintenance and release of an RRC connection between the UE 301 and RAN 310 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MTBs and SIBs may comprise one or more IEs, which may each comprise individual data fields or data structures.

The NAS 857 may form the highest stratum of the control plane between the UE 301 and the AMF. The NAS 857 may support the mobility of the UEs 301 and the session management procedures to establish and maintain IP connectivity between the UE 301 and a P-GW in LTE systems.

According to various embodiments, one or more protocol entities of arrangement 800 may be implemented in UEs 301, RAN nodes 311, AMF in NR implementations or MME 421 in LTE implementations, UPF in NR implementations or S-GW 422 and P-GW 423 in LTE implementations, or the like to be used for control plane or user plane communications protocol stack between the aforementioned devices. In such embodiments, one or more protocol entities that may be implemented in one or more of UE 301, gNB 311, AMF, etc. may communicate with a respective peer protocol entity that may be implemented in or on another device using the services of respective lower layer protocol entities to perform such communication. In some embodiments, a gNB- CU of the gNB 311 may host the RRC 855, SDAP 847, and PDCP 840 of the gNB that controls the operation of one or more gNB-DUs, and the gNB-DUs of the gNB 311 may each host the RLC 830, MAC 820, and PHY 810 of the gNB 311.

In a first example, a control plane protocol stack may comprise, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In NR implementations, the AP 863 may be an NG application protocol layer (NGAP or NG-AP) 863 for the NG interface 313 defined between the NG-RAN node 311 and the AMF, or the AP 863 may be an Xn application protocol layer (XnAP or Xn-AP) 863 for the Xn interface 312 that is defined between two or more RAN nodes 311.

The NG-AP 863 may support the functions of the NG interface 313 and may comprise Elementary Procedures (EPs). An NG-AP EP may be a unit of interaction between the NG-RAN node 311 and the AMF. The NG-AP 863 services may comprise two groups: UE-associated services (e.g., services related to a UE 301) and non-UE-associated services (e.g., services related to the whole NG interface instance between the NG-RAN node 311 and AMF). These services may include functions including, but not limited to: a paging function for the sending of paging requests to NG-RAN nodes 311 involved in a particular paging area; a UE context management function for allowing the AMF to establish, modify, and/or release a UE context in the AMF and the NG-RAN node 311; a mobility function for UEs 301 in ECM-CONNECTED mode for intra-system HOs to support mobility within NG-RAN and inter-system HOs to support mobility from/to EPS systems; a NAS Signaling Transport function for transporting or rerouting NAS messages between UE 301 and AMF; a NAS node selection function for determining an association between the AMF and the UE 301; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 311 via CN 320; and/or other like functions.

The XnAP 863 may support the functions of the Xn interface 312 and may comprise XnAP basic mobility procedures and XnAP global procedures. The XnAP basic mobility procedures may comprise procedures used to handle UE mobility within the NG RAN 311 (or E-UTRAN 410), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 301, such as Xn interface setup and reset procedures, NG-RAN update procedures, cell activation procedures, and the like.

In LTE implementations, the AP 863 may be an S1 Application Protocol layer (S1-AP) 863 for the S1 interface 313 defined between an E-UTRAN node 311 and an MME, or the AP 863 may be an X2 application protocol layer (X2AP or X2-AP) 863 for the X2 interface 312 that is defined between two or more E-UTRAN nodes 311.

The S1 Application Protocol layer (S1-AP) 863 may support the functions of the S1 interface, and similar to the NG-AP discussed previously, the S1-AP may comprise S1-AP EPs. An S1-AP EP may be a unit of interaction between the E-UTRAN node 311 and an MME 421 within an LTE CN 320. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 312 and may comprise X2AP basic mobility procedures and X2AP global procedures. The X2AP basic mobility procedures may comprise procedures used to handle UE mobility within the E-UTRAN 320, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 301, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 311 and the AMF/MME 421 based, in part, on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 311 may comprise L2 and L1 layer communication links (e.g., wired or wireless) with the MME/AMF to exchange information.

In a second example, a user plane protocol stack may comprise, in order from highest layer to lowest layer, SDAP 847, PDCP 840, RLC 830, MAC 820, and PHY 810. The user plane protocol stack may be used for communication between the UE 301, the RAN node 311, and UPF in NR implementations or an S-GW 422 and P-GW 423 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 311 and the S-GW 422 may utilize an S1-U interface to exchange user plane data via a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 422 and the P-GW 423 may utilize an S5/S8a interface to exchange user plane data via a protocol stack comprising an L1 layer, an L2 layer, the UDP/IP layer 852, and the GTP-U 853. As discussed previously, NAS protocols may support the mobility of the UE 301 and the session management procedures to establish and maintain IP connectivity between the UE 301 and the P-GW 423.

Moreover, although not shown by FIG. 8, an application layer may be present above the AP 863 and/or the transport network layer 854. The application layer may be a layer in which a user of the UE 301, RAN node 311, or other network element interacts with software applications being executed, for example, by application circuitry 505 or application circuitry 605, respectively. The application layer may also provide one or more interfaces for software applications to interact with communications systems of the UE 301 or RAN node 311, such as the baseband circuitry 710. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 9:
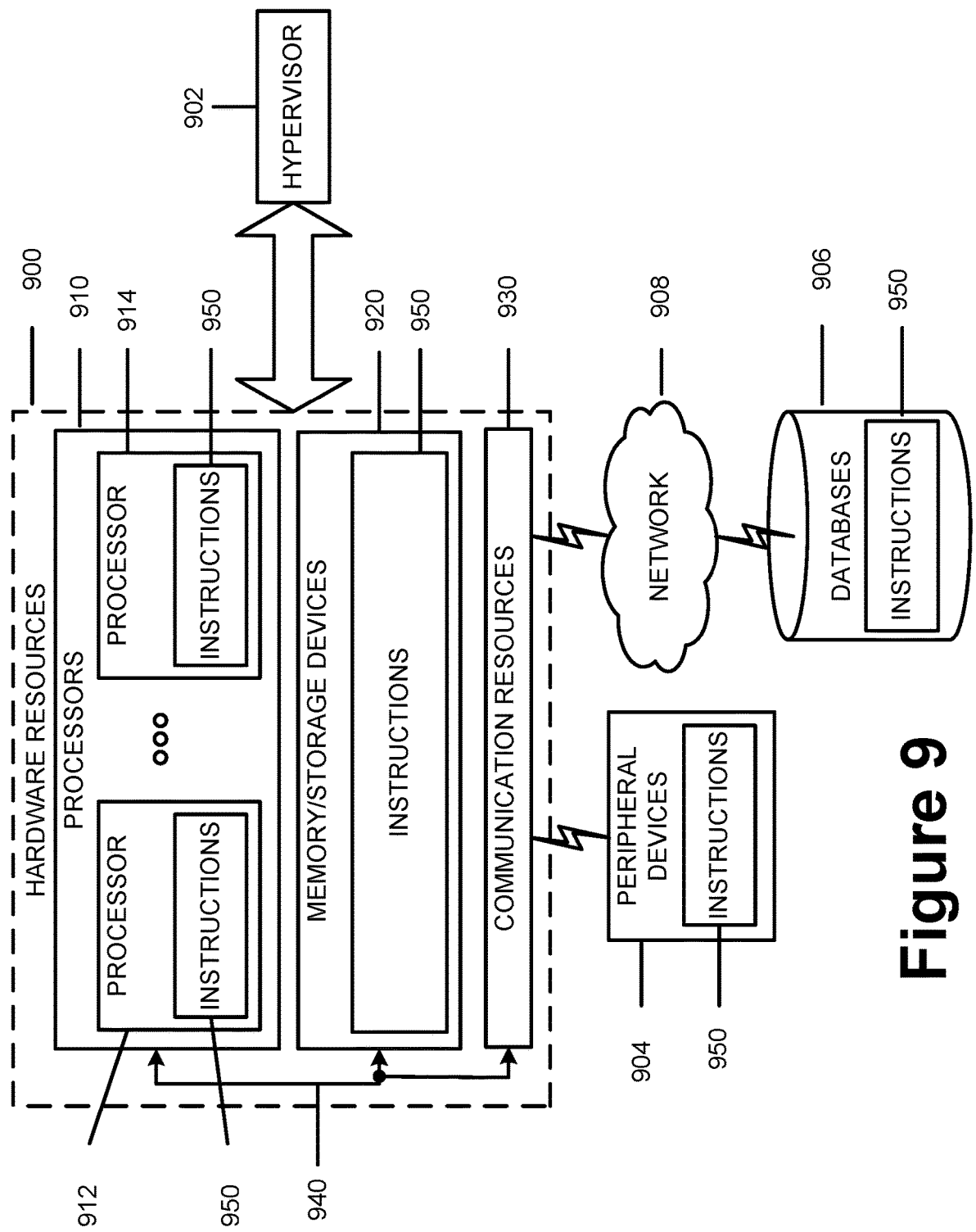

FIG. 9 is a block diagram illustrating components, according to some example embodiments, able to read instructions from a machine-readable or computer-readable medium (e.g., anon-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

What is claimed is:

1. A method comprising:
    receiving, by a first integrated access and backhaul (IAB) node, a Radio Resource Control (RRC) message from a second IAB node, the RRC message comprising an information element (IE) having fields specifying a slot offset and a subframe offset of a backhaul random access channel (RACH) periodicity to an existing RACH configuration, wherein the slot offset comprises a prach-SlotOffset field specifying a slot-based offset of the backhaul RACH periodicity to the existing RACH configuration, and the subframe offset comprises a prach-SubframeOffset field specifying a subframe-based offset of the backhaul RACH periodicity to the existing RACH configuration;
    determining, while maintaining the existing RACH configuration, a new RACH configuration that includes the slot offset and the subframe offset from the RRC message; and
    in response to determining the new RACH configuration:
        determining to stop using the existing RACH configuration; and
        initiating a random access procedure with the IAB node using the new RACH configuration with the slot offset and the subframe offset, the initiating comprising determining a new slot number or a new subframe number based at least on the slot offset or the subframe offset, an existing slot number or an existing subframe number for the existing RACH configuration, and a number of slots or subframes in a frame.

2. The method of claim 1, wherein determining, based on the RRC message, the new RACH configuration comprises:
    determining a scaling factor that has a value selected from {1, 2, 4, 8, 16, 32, 64} based on the RRC message.

3. The method of claim 2, wherein the scaling factor defines an adjustment to the periodicity included in the existing RACH configuration associated with the IAB node.

4. The method of claim 1, wherein determining, based on the RRC message, the new RACH configuration comprises:
    determining a frame-based offset that has a value selected from (0 . . . 63) based on the RRC message.

5. The method of claim 4, wherein the frame-based offset defines an adjustment to a frame number included in the existing RACH configuration associated with the IAB node, wherein the frame number identifies a frame containing backhaul traffic.

6. The method of claim 1, wherein determining, based on the RRC message, the new RACH configuration comprises:

determining the slot offset or the subframe offset based on the RRC message.

7. The method of claim 6, wherein the slot offset or the subframe offset defines an adjustment to the existing slot number or the existing subframe number included in the existing RACH configuration, wherein the existing slot number or the existing subframe number identifies a slot or a subframe containing backhaul traffic.

8. The method of claim 1, wherein the RRC message is a RACH-ConfigGeneric message.

9. The method of claim 1, wherein the RRC message is a RACH-ConfigDedicated message.

10. The method of claim 1, wherein the RRC message comprises one or more of:
a prach-scalingFactor field specifying a scaling factor of the backhaul RACH periodicity to the existing RACH configuration, or
a prach-FrameOffset field specifying a frame-based offset of the backhaul RACH periodicity to the existing RACH configuration.

11. A method comprising:
determining, by an apparatus for an integrated access and backhaul (IAB) node with an existing random access channel (RACH) configuration, a new RACH configuration that includes a slot offset and a subframe offset;
generating, in response to determining the new RACH configuration for the IAB node, a message comprising an information element (IE) having fields specifying a slot offset and a subframe offset of a backhaul RACH periodicity to the existing RACH configuration, wherein the slot offset comprises a prach-SlotOffset field specifying a slot-based offset of the backhaul RACH periodicity to the existing RACH configuration, and the subframe offset comprises a prach-SubframeOffset field specifying a subframe-based offset of the backhaul RACH periodicity to the existing RACH configuration; and
transmitting the message comprising the slot offset and the subframe offset to the IAB node to cause the IAB node to determine a new slot number or a new subframe number for the new RACH configuration based at least on the slot offset or the subframe offset, an existing slot number or an existing subframe number for the existing RACH configuration, and a number of slots or subframes in a frame.

12. The method of claim 11, wherein:
the new RACH configuration includes a scaling factor that has a value selected from {1, 2, 4, 8, 16, 32, 64}; and
generating the message comprises generating the message comprising a) the slot offset or the subframe offset for the new RACH configuration, and b) the scaling factor.

13. The method of claim 11, wherein:
determining the new RACH configuration comprises determining the new RACH configuration that includes a frame-based offset that has a value selected from (0 . . . 63); and
generating the message comprises generating the message comprising a) the slot offset or the subframe offset for the new RACH configuration, and b) the frame-based offset.

14. The method of claim 11, wherein the new RACH configuration includes the slot offset or the subframe offset that identifies a slot or a subframe containing backhaul traffic.

15. The method of claim 11, wherein the message is a Radio Resource Control (RRC) message.

16. The method of claim 15, wherein the RRC message is a RACH-ConfigGeneric message.

17. The method of claim 15, wherein the RRC message is a RACH-ConfigDedicated message.

18. The method of claim 11, wherein determining, by the apparatus, the RACH configuration comprises determining, by an IAB parent node or by one or more processors, the RACH configuration.

19. An apparatus comprising one or more processors configured to perform operations comprising:
determining, for an integrated access and backhaul (IAB) node with an existing random access channel (RACH) configuration, a new RACH configuration that includes a slot offset and a subframe offset;
generating, in response to determining the new RACH configuration for the IAB node, a message comprising an information element (IE) having fields specifying a slot offset and a subframe offset of a backhaul RACH periodicity to the existing RACH configuration, wherein the slot offset comprises a prach-SlotOffset field specifying a slot-based offset of the backhaul RACH periodicity to the existing RACH configuration, and the subframe offset comprises a prach-SubframeOffset field specifying a subframe-based offset of the backhaul RACH periodicity to the existing RACH configuration; and
transmitting the message comprising the slot offset and the subframe offset to the IAB node to cause the IAB node to determine a new slot number or a new subframe number for the new RACH configuration based at least on the slot offset or the subframe offset, an existing slot number or an existing subframe number for the existing RACH configuration, and a number of slots or subframes in a frame.

20. The apparatus of claim 19, wherein:
the new RACH configuration includes a scaling factor that has a value selected from {1, 2, 4, 8, 16, 32, 64}; and
generating the message comprises generating the message comprising a) the slot offset or the subframe offset for the new RACH configuration, and b) the scaling factor.

* * * * *

UNITED STATES PATENT AND TRADEMARK OFFICE
CERTIFICATE OF CORRECTION

| | | |
|---|---|---|
| PATENT NO. | : 12,336,018 B2 | Page 1 of 1 |
| APPLICATION NO. | : 17/441631 | |
| DATED | : June 17, 2025 | |
| INVENTOR(S) | : Lili Wei, Qian Li and Geng Wu | |

It is certified that error appears in the above-identified patent and that said Letters Patent is hereby corrected as shown below:

In the Specification

Column 1, Lines 11-13, Delete ""RANDOM ACCESS CHANNEL CONFIGURATION IN AN INTEGRATED ACCESS AND BACKHAUL NETWORK,"" and insert -- "SIGNALING MECHANISMS OF RACH CONFIGURATIONS FOR IAB NODES," --.

Signed and Sealed this
Fourth Day of November, 2025

John A. Squires
*Director of the United States Patent and Trademark Office*